(12) United States Patent
Yamashita et al.

(10) Patent No.: US 11,572,434 B2
(45) Date of Patent: Feb. 7, 2023

(54) CURABLE COMPOSITION, METHOD FOR PRODUCING SAME, AND ARTICLE USING SAME

(71) Applicant: DAIKIN INDUSTRIES, LTD., Osaka (JP)

(72) Inventors: Tsuneo Yamashita, Osaka (JP); Eiji Sakamoto, Osaka (JP); Saya Nii, Osaka (JP); Hirotoshi Sakashita, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 351 days.

(21) Appl. No.: 16/498,487

(22) PCT Filed: Mar. 30, 2018

(86) PCT No.: PCT/JP2018/013721
§ 371 (c)(1),
(2) Date: Sep. 27, 2019

(87) PCT Pub. No.: WO2018/181936
PCT Pub. Date: Oct. 4, 2018

(65) Prior Publication Data
US 2021/0189052 A1    Jun. 24, 2021

(30) Foreign Application Priority Data
Mar. 31, 2017 (JP) .............................. JP2017-072445

(51) Int. Cl.
| C08G 18/50 | (2006.01) |
| C08F 222/10 | (2006.01) |
| C08F 299/02 | (2006.01) |
| C08G 65/323 | (2006.01) |
| C09D 4/00 | (2006.01) |
| C09D 175/08 | (2006.01) |
| C08G 18/67 | (2006.01) |
| C08G 18/79 | (2006.01) |
| C08L 75/08 | (2006.01) |

(52) U.S. Cl.
CPC .... *C08G 18/5015* (2013.01); *C08F 222/1065* (2020.02); *C08F 299/02* (2013.01); *C08G 18/50* (2013.01); *C08G 18/5066* (2013.01); *C08G 18/67* (2013.01); *C08G 18/791* (2013.01); *C08G 65/3236* (2013.01); *C08L 75/08* (2013.01); *C09D 4/00* (2013.01); *C09D 175/08* (2013.01); *C08G 18/5036* (2013.01)

(58) Field of Classification Search
CPC ............ C08G 18/5015; C08G 18/5066; C08G 65/3236; C08G 18/5036; C08G 18/50; C08G 18/67; C08G 18/791; C08F 222/1065; C08F 299/02; C09D 4/00; C09D 175/08; C08L 75/08
See application file for complete search history.

(56) References Cited

U.S. PATENT DOCUMENTS

| 2004/0181008 A1* | 9/2004 | Hanazawa ............ C08G 18/67 524/589 |
| 2007/0112162 A1 | 5/2007 | Kinney et al. |
| 2012/0100369 A1 | 4/2012 | Hanazawa et al. |
| 2012/0156510 A1 | 6/2012 | Okafuji et al. |
| 2016/0237199 A1 | 8/2016 | Yoshida et al. |
| 2017/0218151 A1 | 8/2017 | Hanazawa et al. |

FOREIGN PATENT DOCUMENTS

| JP | 2016-27170 A1 | 2/2016 |
| KR | 101330443 B1 | 11/2013 |
| WO | 03/002628 A1 | 1/2003 |
| WO | 2010/147142 A1 | 12/2010 |

OTHER PUBLICATIONS

International Preliminary Report on Patentability with a Translation of Written Opinion in International Application No. PCT/JP2018/013721, dated Oct. 10, 2019.
International Search Report for PCT/JP2018/013721 dated Jun. 5, 2018 [PCT/ISA/210].
Communication dated Sep. 16, 2020, from the European Patent Office in counterpart European Application No. 18776274.5.

* cited by examiner

*Primary Examiner* — Rabon A Sergent
(74) *Attorney, Agent, or Firm* — Sughrue Mion, PLLC

(57) ABSTRACT

A composition including at least one compound having a perfluoropolyether group and a curable site, wherein in a molecular weight distribution curve in gel permeation chromatography measurement, the following formula is satisfied: $M2/M1 \leq 3.5$, wherein M1 is a molecular weight at a main peak, and M2 is a molecular weight at 25% intensity of an intensity of the main peak on a higher molecular weight side than M1. Also disclosed is a curable composition containing the composition and a method for producing the curable composition.

10 Claims, 1 Drawing Sheet

CURABLE COMPOSITION, METHOD FOR PRODUCING SAME, AND ARTICLE USING SAME

CROSS REFERENCE TO RELATED APPLICATIONS

This application is a National Stage of International Application No. PCT/JP2018/013721, filed on Mar. 30, 2018, which claims priority from Japanese Patent Application No. 2017-072445, filed on Mar. 31, 2017.

TECHNICAL FIELD

The present invention relates to a curable composition, a method for producing the curable composition, and an article in which the curable composition is used.

BACKGROUND ART

It is known that the use of a composition containing a fluorine-containing compound, or a compound having a perfluoropolyether group in particular for surface treatment of a base material, makes it possible to form a surface-treating layer having excellent water-repellency, oil-repellency, antifouling properties, and the like. For example, Patent Literature 1 describes a surface-treating agent obtained by reacting a composition containing a carbon-carbon double bond, which is composed of (a) a triisocyanate prepared by trimerizing a diisocyanate and (b) a combination of at least two active hydrogen-containing compounds, wherein component (b) consists of (b-1) a perfluoropolyether having one active hydrogen atom and (b-2) a monomer having active hydrogen and a carbon-carbon double bond.

CITATION LIST

Patent Literature

Patent Literature 1
International Publication No. WO 2003/002628

SUMMARY OF INVENTION

Problem to be Solved by the Invention

The surface-treating layer formed of the surface-treating agent as described above is required to be transparent, in addition to having excellent water-repellency, oil-repellency, antifouling properties, and the like. However, it was found that the surface-treating layer may be clouded when using such a surface-treating agent. As a result of having conducted diligent research, the present inventors found that the clouded surface-treating layer is formed when the curable composition contained in the surface-treating agent comprises a large amount of a high molecular weight compound.

An object of the present invention is to provide a composition comprising a compound having a perfluoropolyether group, wherein the content of a high molecular weight compound is decreased. Another object of the present invention is to provide a curable composition comprising the above composition. Another object of the present invention is to provide a production method suitable for producing the curable composition. Moreover, another object of the present invention is to provide an article in which the curable composition is used.

Solution to Problem

According to the first aspect of the present invention, provided is a composition comprising at least one compound having a perfluoropolyether group and a curable site,
wherein
in a molecular weight distribution curve in gel permeation chromatography measurement, the following formula is satisfied:

$$M2/M1 \leq 3.5$$

wherein
M1 is a molecular weight at a main peak, and
M2 is a molecular weight at 25% intensity of an intensity of the main peak on a higher molecular weight side than M1.

According to the second aspect of the present invention, a curable composition comprising the composition is provided.

According to the third aspect of the present invention, provided is a method for producing a curable composition, wherein the method comprises:
mixing a composition comprising compound (a) having an isocyanate group and a composition comprising a compound having active hydrogen;
reacting compound (a) with the compound having active hydrogen to form a compound having a perfluoropolyether group and a curable site;
mixing a reaction composition comprising the compound having a perfluoropolyether group and a curable site with solvents to form a precipitate comprising the compound having a perfluoropolyether group and a curable site; and
separating the formed precipitates,
wherein
the solvents comprise a solvent in which the compound having the perfluoropolyether group and the curable site is substantially insoluble and a polar solvent.

According to the fourth aspect of the present invention, provided is a method for producing a curable composition, wherein the method comprises:
mixing a composition comprising compound (a) having an isocyanate group and a composition comprising a compound having active hydrogen; and
reacting compound (a) with the compound having active hydrogen to form a reaction composition comprising a compound having a perfluoropolyether group and a curable site,
wherein
the composition comprising compound (a) comprises an isocyanurate-type polyisocyanate and the content of a triisocyanate obtained by trimerizing a diisocyanate is 60% by mass or more based on the total mass of the composition comprising compound (a).

According to the fifth aspect of the present invention, an article having a base material and a surface-treating layer which is formed on a surface of the base material from the curable composition is provided.

Advantageous Effects of Invention

The present invention can provide a curable composition suitable for forming a surface-treating layer that is unlikely clouded.

DESCRIPTION OF EMBODIMENT

Figure 1:
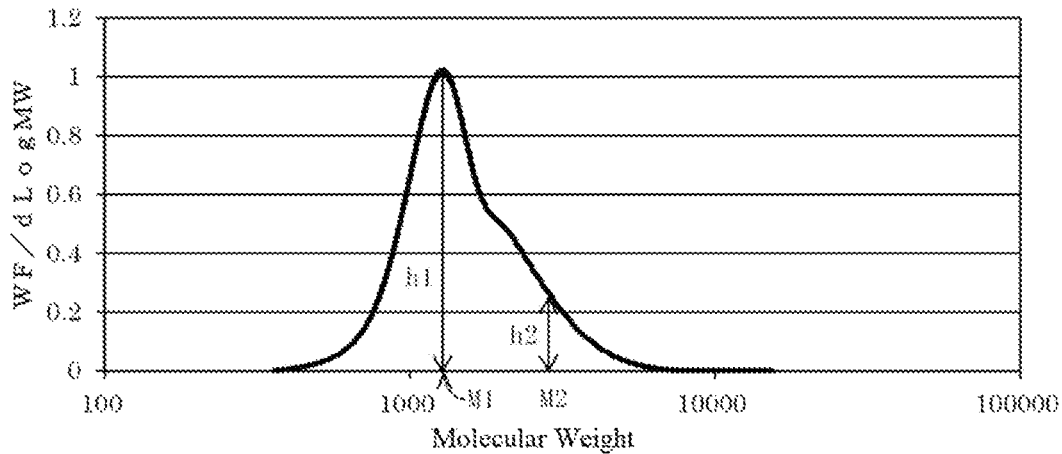
FIG. 1 is a diagram showing the molecular weight distribution curve, which is obtained using gel permeation chromatography (GPC), of composition X obtained in Synthesis Example 3.
Figure 2:
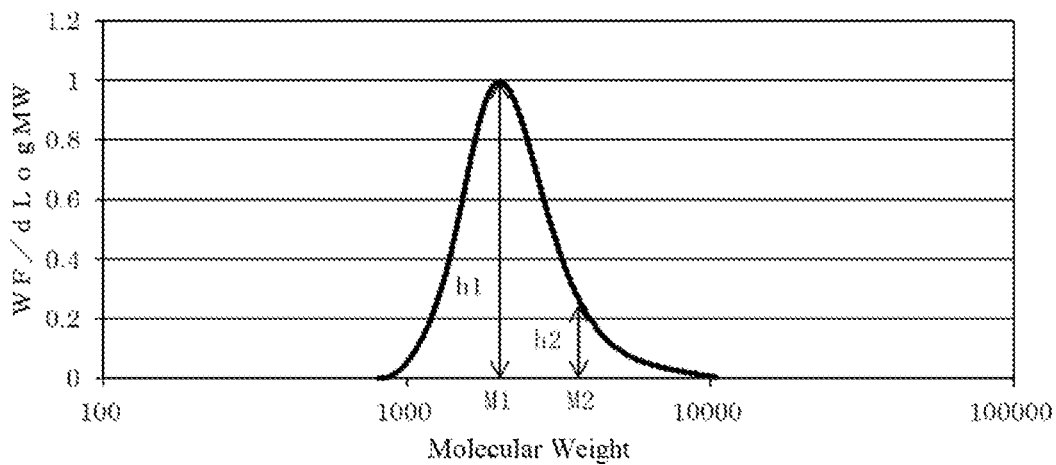
FIG. 2 is a diagram showing the molecular weight distribution curve, which is obtained using GPC, of composition X obtained in Synthesis Example 6.
Figure 3:
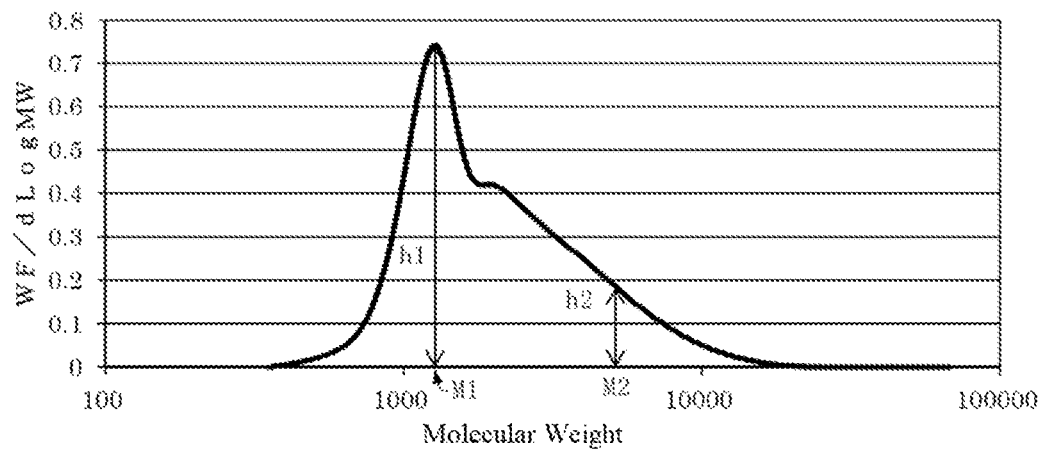
FIG. 3 is a diagram showing the molecular weight distribution curve, which is obtained using GPC, of composition X obtained in Synthesis Example 1.

Hereinafter, the present invention will now be described, but the present invention is not limited to the following description.

[Composition α]

The composition of the present invention (hereinafter sometimes referred to as composition α) comprises a compound having a perfluoropolyether group and a curable site (hereinafter sometimes referred to as component β).

In one embodiment, the number average molecular weight of the compound having a perfluoropolyether group and a curable site is 1000 or more. The upper limit of the number average molecular weight is, for example, 30000. The number average molecular weight may be measured by GPC or may be calculated from an integral value of $^{19}$F-NMR. GPC measurement may be performed under the same conditions as those used in the analysis of composition α, which will be described below.

Composition α preferably comprises component β in an amount of 100% by mass and more preferably 99% or less based on the total of composition α.

Composition α may be substantially component β, a raw material of component β, and an impurity and, preferably, is substantially composed of component β and the raw material of component β. The phrase "substantially component β and the raw material of component β" means that any compound other than component β and the raw material of component β may not be contained or a compound other than component β and the raw material of component β may be contained only a minute amount. The phrase "substantially component β, the raw material of component β, and the impurity" means that any compound other than component β, the raw material of component β, and the impurity may not be contained, or a compound other than component β, the raw material of component β, and the impurity may be contained only a minute amount. An example of the impurities may be F—(PFPE)—CF$_3$. PFPE represents a perfluoropolyether group, which will be described below.

The curable site is not limited, and examples include an allyl group, a cinnamic acid group, a sorbic acid group, a substituted acryloyl group, and a methacryloyl group (hereinafter an acryloyl group and a methacryloyl group may be collectively referred to as a "(meth)acryloyl group".

A preferable curable site varies depending on the material to be coated and, for example, when the material is an amorphous synthetic resin (such as an acrylic resin), the "curable site" is preferably an allyl group, a cinnamic acid group, a sorbic acid group, or $CH_2=CX_1-C(O)-$ (wherein $X_1$ represents a hydrogen atom, a chlorine atom, a fluorine atom, or a $C_{1-10}$ alkyl group optionally substituted with a fluorine atom (such as a (meth)acryloyl group), and is more preferably an acryloyl group or a methacryloyl group.

The perfluoropolyether group (hereinafter sometimes referred to as PFPE) is a group represented by the following formula:

$$-(OC_6F_{12})_a-(OC_5F_{10})_b-(OC_4F_8)_c-(OC_3F_6)_d-(OC_2F_4)_e-(OCF_2)_f-$$

wherein a, b, c, d, e, and f are each independently an integer of 0 or more and 200 or less, and the sum of a, b, c, d, e, and f is at least 1. Preferably, a, b, c, d, e, and f are each independently an integer of 0 or more and 100 or less. Preferably, the sum of a, b, c, d, e, and f is 5 or more, and more preferably 10 or more, such as 10 or more and 100 or less. The occurrence order of the respective repeating unit in parentheses provided with a, b, c, d, e, or f is not limited in the formula.

These repeating units may be linear or branched, and are preferably linear. For example, $-(OC_6F_{12})-$ may be $-(OCF_2CF_2CF_2CF_2CF_2CF_2)-$, $-(OCF(CF_3)CF_2CF_2CF_2CF_2)-$, $-(OCF_2CF(CF_3)CF_2CF_2CF_2)-$, $-(OCF_2CF_2CF(CF_3)CF_2CF_2)-$, $-(OCF_2CF_2CF_2CF(CF_3)CF_2)-$, $-(OCF_2CF_2CF_2CF_2CF(CF_3))-$ or the like, and is preferably $-(OCF_2CF_2CF_2CF_2CF_2CF_2)-$. $-(OC_5F_{10})-$ may be $-(OCF_2CF_2CF_2CF_2CF_2)-$, $-(OCF(CF_3)CF_2CF_2CF_2)-$, $-(OCF_2CF(CF_3)CF_2CF_2)-$, $-(OCF_2CF_2CF(CF_3)CF_2)-$, $-(OCF_2CF_2CF_2CF(CF_3))-$ or the like, and is preferably $-(OCF_2CF_2CF_2CF_2CF_2)-$. $-(OC_4F_8)-$ may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$ and $(OCF_2CF(C_2F_5))-$, and is preferably $-(OCF_2CF_2CF_2CF_2)-$. $-(OC_3F_6)-$ may be any of $-(OCF_2CF_2CF_2)-$, $-(OCF(CF_3)CF_2)-$, and $(OCF_2CF(CF_3))-$, and is preferably $-(OCF_2CF_2CF_2)-$. $-(OC_2F_4)-$ may be any of $-(OCF_2CF_2)-$ and $(OCF(CF_3))-$, and is preferably $-(OCF_2CF_2)-$.

In one embodiment, PFPE is $-(OC_3F_6)_d-$ (wherein d is an integer of 1 or more and 200 or less, preferably 5 or more and 200 or less, and more preferably 10 or more and 200 or less). Preferably, PFPE is $-(OCF_2CF_2CF_2)_d-$ (wherein d is an integer of 1 or more and 200 or less, preferably 5 or more and 200 or less, and more preferably 10 or more and 200 or less), or $(OCF(CF_3)CF_2)_d-$ (wherein d is an integer of 1 or more and 200 or less, preferably 5 or more and 200 or less, and more preferably 10 or more and 200 or less). More preferably, PFPE is $-(OCF_2CF_2CF_2)_d-$ (wherein d is an integer of 1 or more and 200 or less, preferably 5 or more and 200 or less, and more preferably 10 or more and 200 or less).

In another embodiment, PFPE is $-(OC_4F_8)_c-(OC_3F_6)_d-(OC_2F_4)_e-(OCF_2)_f-$ (wherein c and d are each independently an integer of 0 or more and 30 or less, e and f are each independently an integer of 1 or more and 200 or less, preferably 5 or more and 200 or less, and more preferably 10 or more and 200 or less, the sum of c, d, e, and f is 5 or more and preferably 10 or more, and the occurrence order of the respective repeating unit enclosed in parentheses provided with a subscript c, d, e, or f is not limited in the formula). Preferably, PFPE is $-(OCF_2CF_2CF_2CF_2)_c-(OCF_2CF_2CF_2)_d-(OCF_2CF_2)_e-(OCF_2)_f-$. In one embodiment, PFPE may be $-(OC_2F_4)_e-(OCF_2)_f-$ (wherein e and f are each independently 1 or more and 200 or less, preferably 5 or more and 200 or less, and more preferably 10 or more and 200 or more, and the occurrence order of the respective repeating unit in parentheses provided with a subscript e or f is not limited in the formula).

In one embodiment, PFPE may be —$(OC_2F_4)_e$—$(OCF_2)_f$— (wherein e and f are each independently an integer of 1 or more and 200 or less, preferably 5 or more and 200 or less, and more preferably 10 or more and 200 or less, and the occurrence order of the respective repeating unit enclosed in parentheses provided with a subscript e or f is not limited in the formula).

In PFPE, the ratio of e to f (hereinafter referred to as the "e/f ratio") is 0.1 or more and 10 or less, preferably 0.2 or more and 5.0 or less, more preferably 0.2 or more and 2.0 or less, and further preferably 0.2 or more and 1.5 or less. With the e/f ratio being in the above range, the water-repellency, the oil-repellency, and the chemical resistance (such as durability against brine, acidic or basic aqueous solutions, acetone, oleic acid, or hexane) of a cured product obtained from the compound may be further improved. A smaller e/f ratio results in better water-repellency, oil-repellency, and chemical resistance of the cured product. On the other hand, with an e/f ratio of 0.1 or more, the stability of the compound can be more increased. A greater e/f ratio results in better stability of the compound.

In another embodiment, PFPE is a group represented by —$(R^8—R^7)_j$— wherein $R^8$ is $OCF_2$ or $OC_2F_4$ and is preferably $OC_2F_4$, and $R^7$ is a group selected from $OC_2F_4$, $OC_3F_6$, $OC_4F_8$, $OC_5F_{10}$, and $OC_6F_{12}$, or is a combination of 2 or 3 groups independently selected from these groups. Preferably, $R^7$ is a group selected from $OC_2F_4$, $OC_3F_6$, and $OC_4F_8$, is a group selected from $OC_3F_6$, $OC_4F_8$, $OC_5F_{10}$, and $OC_6F_{12}$, or is a combination of 2 or 3 groups independently selected from these groups. The combination of 2 or 3 groups independently selected from $OC_2F_4$, $OC_3F_6$, and $OC_4F_8$ is not limited, and examples include —$OC_2F_4OC_3F_6$—, —$OC_2F_4OC_4F_8$—, —$OC_3F_6OC_2F_4$—, —$OC_3F_6OC_3F_6$—, —$OC_3F_6OC_4F_8$—, —$OC_4F_8OC_4F_8$—, —$OC_4F_8OC_3F_6$—, —$OC_4F_8OC_2F_4$—, —$OC_2F_4OC_2F_4OC_3F_6$—, —$OC_2F_4OC_2F_4OC_4F_8$—, —$OC_2F_4OC_3F_6OC_2F_4$—, —$OC_2F_4OC_3F_6OC_3F_6$—, —$OC_2F_4OC_4F_8OC_2F_4$—, —$OC_3F_6OC_2F_4OC_2F_4$—, —$OC_3F_6OC_2F_4OC_3F_6$—, —$OC_3F_6OC_3F_6OC_2F_4$—, and $OC_4F_8OC_2F_4OC_2F_4$—. j is an integer of 2 or more, preferably 3 or more, more preferably 5 or more, and is 100 or less and preferably 50 or less. In the formula, $OC_2F_4$, $OC_3F_6$, $OC_4F_8$, $OC_5F_{10}$, and $OC_6F_{12}$ may be either linear or branched, and is preferably linear. In this embodiment, PFPE is preferably —$(OC_2F_4—OC_3F_6)_j$— or $(OC_2F_4—OC_4F_8)_j$—.

In one embodiment, PFPE in each occurrence is independently a group represented by —$(OC_6F_{12})_a$—$(OC_5F_{10})_b$—$(OC_4F_8)_c$—$(OC_3F_6)_d$—$(OC_2F_4)_e$—$(OCF_2)_f$—, and may have at least one branched structure in PFPE. That is, in the present embodiment, PFPE has at least one $CF_3$ terminal (specifically —$CF_3$, —$C_2F_5$, or the like, and mere specifically —$CF_3$).

In the present embodiment, a, b, c, d, e, and f in the formula are each independently an integer of 0 or more and 200 or less, and the sum of a, b, c, d, e, and f is at least 1. Preferably, a, b, c, d, e, and f are each independently an integer of 0 or more and 100 or less. Preferably, the sum of b, c, d, e, and f is 5 or more, and more preferably 10 or more. Preferably, the sum of a, b, c, d, e, and f is 200 or less and more preferably 100 or less, such as 10 or more and 200 or less and more specifically 10 or more and 100 or less. The occurrence order of the respective repeating unit enclosed in parentheses provided with a, b, c, d, e, or f is not limited in the formula.

In the present embodiment, PFPE preferably has at least five branched structures, more preferably 10 branched structures, and particularly preferably 20 branched structures.

In the present embodiment, in the PFPE structure, the number of repeating units having a branched structure is preferably 40 or more, more preferably 60 or more, and particularly preferably 80 or more based on the total number of repeating units (such as the sum of a, b, c, d, e, and f) being 100. In the PFPE structure, the number of repeating units having a branched structure may be 100 or less, such as 90 or less, based on the total number of repeating units being 100.

In the present embodiment, in the PFPE structure, the number of repeating units having a branched structure is preferably in the range of 40 to 100, more preferably in the range of 60 to 100, and particularly preferably in the range of 80 to 100 based on the total number of repeating units being 100.

In the present embodiment, an example of the branched chain in the branched structure may be $CF_3$.

In the present embodiment, as for the repeating unit having a branched structure, examples of —$(OC_6F_{12})$— include —$(OCF(CF_3)CF_2CF_2CF_2CF_2)$—, —$(OCF_2CF(CF_3)CF_2CF_2CF_2)$—, —$(OCF_2CF_2CF(CF_3)CF_2CF_2)$—, —$(OCF_2CF_2CF_2CF(CF_3)CF_2)$—, —$(OCF_2CF_2CF_2CF_2CF(CF_3))$— and the like. Examples of —$(OC_5F_{10})$— include —$(OCF(CF_3)CF^2CF_2CF_2)$—, —$(OCF_2CF(CF_3)CF_2CF_2)$—, —$(OCF_2CF_2CF(CF_3)CF_2)$—, —$(OCF_2CF_2CF_2CF(CF_3))$—, and the like. Examples of —$(OC_4F_8)$— include —$(OCF(CF_3)CF_2CF_2)$—, —$(OCF_2CF(CF_3)CF_2)$—, —$(OCF_2CF_2CF(CF_3))$—, —$(OC(CF_3)_2CF_2)$—, —$(OCF_2C(CF_3)_2)$—, —$(OCF(CF_3)CF(CF_3))$—, —$(OCF(C_2F_5)CF_2)$— and —$(OCF_2CF(C_2F_5))$—. Examples of —$(OC_3F_5)$— include —$(OCF(CF_3)CF_2)$— and —$(OCF_2CF(CF_3))$—. An example of —$(OC_2F_4)$— may be —$(OCF(CF_3))$—.

In the present embodiment, PFPE may contain a linear repeating unit together with a repeating unit having a branched structure. Examples of the linear repeating unit include —$(OCF_2CF_2CF_2CF_2CF_2CF_2)$—, —$(OCF_2CF_2CF_2CF_2CF_2)$—, —$(OCF_2CF_2CF_2CF_2)$—, —$(OCF_2CF_2CF_2)$—, and —$(OCF_2CF_2)$—.

In the present embodiment, in PFPE, the repeating units —$(OC_6F_{12})$—, —$(OC_5F_{10})$—, —$(OC_4F_8)$—, and —$(OC_3F_6)$— preferably have a branched structure.

In the present embodiment, PFPE is more preferably composed of repeating units $OC_6F_{12}$, $OC_5F_{10}$, $OC_4F_8$, and $OC_3F_6$ having a branched structure.

In one embodiment, PFPE is —$(OC_3F_6)_d$— (wherein d is an integer of 1 or more and 200 or less, preferably 5 or more and 200 or less, and more preferably 10 or more and 200 or less) and has at least one branched structure in PFPE.

In the present embodiment, PFPE may further contain a linear repeating unit —$(OCF_2CF_2CF_2)$—.

In the above embodiment, PFPE is preferably composed of a repeating unit $OC_3F_6$ having a branched structure. PFPE is more preferably represented by the formula: —$(OCF_2CF(CF_3))_d$— wherein d is an integer of 1 or more and 200 or less, preferably 5 or more and 200 or less, and more preferably 10 or more and 200 or less.

In another embodiment, PFPE is —$(OC_4F_8)_c$—$(OC_3F_6)_d$—$(OC_2F_4)_e$—$(OCF_2)_f$— (wherein c and d are each independently an integer of 0 or more and 30 or less, e and f are each independently an integer of 1 or more and 200 or less, preferably 5 or more and 200 or less, and more preferably 10 or more and 200 or less, the sum of c, d, e, and f is at least 5 or more and preferably 10 or more, and the occurrence order of the respective repeating unit enclosed in parentheses provided with a subscript c, d, e, or f is not limited in the formula) and has at least one branched structure in PFPE.

In another embodiment, PFPE is a group represented by $-(R^6-R^7)_j-$ and has at least one branched structure in PFPE, wherein $R^6$ is $OCF_2$ or $OC_2F_4$ and is preferably $OC_2F_4$, and $R^7$ is a group selected from $OC_2F_4$, $OC_3F_6$, $OC_4F_8$, $OC_5F_{10}$, and $OC_6F_{12}$, or is a combination of 2 or 3 groups independently selected from these groups. Preferably, $R^7$ is a group selected from $OC_2F_4$, $OC_3F_6$, and $OC_4F_8$, is a group selected from $OC_3F_6$, $OC_4F_8$, $OC_5F_{10}$, and $OC_6F_{12}$, or is a combination of 2 or 3 groups independently selected from these groups. The combination of 2 or 3 groups independently selected from $OC_2F_4$, $OC_3F_6$, and $OC_4F_8$ is not limited, and examples include $-OC_2F_4OC_3F_6-$, $-OC_2F_4OC_4F_8-$, $-OC_3F_6OC_2F_4-$, $-OC_3F_6OC_3F_6-$, $-OC_3F_6OC_4F_8-$, $-OC_4F_8OC_4F_8-$, $-OC_4F_8OC_3F_6-$, $-OC_4F_8OC_2F_4-$, $-OC_2F_4OC_2F_4OC_3F_6-$, $-OC_2F_4OC_2F_4OC_4F_8-$, $-OC_2F_4OC_3F_6OC_2F_4-$, $-OC_2F_4OC_3F_6OC_3F_6-$, $-OC_2F_4OC_4F_8OC_2F_4-$, $-OC_3F_6OC_2F_4OC_2F_4-$, $-OC_3F_6OC_2F_4OC_3F_6-$, $-OC_3F_6OC_3F_6OC_2F_4-$, and $-OC_4F_8OC_2F_4OC_2F_4-$. j is an integer of or more, preferably 3 or more, more preferably 5 or more, and is 100 or less and preferably 50 or less. In the formula, $OC_2F_4$, $OC_3F_6$, $OC_4F_8$, $OC_5F_{10}$, and $OC_6F_{12}$ preferably have a branched structure.

More preferably, in the above embodiment, PFPE is composed of a repeating unit $OC_6F_{12}$, $OC_6F_{10}$, $OC_4F_8$, and $OC_3F_6$ having a branched structure.

In a preferable embodiment, the compound having a perfluoropolyether group and a curable site is a compound having a polyisocyanate structure (such as a triisocyanate structure). Herein, the "polyisocyanate structure" means a structure having multiple units of a structure derived from an $-NCO$ group, such as $-NHCO-$. The compound having a polyisocyanate structure is preferably contained as a main component of composition α.

Examples of the compound having a polyisocyanate structure include (a) compounds having an isocyanate group ($-NCO$ group) and (b) compounds obtained by reacting a compound having active hydrogen.

[(A) Composition Containing Compound Having Isocyanate Group ($-NCO$ Group)]

One compound having an isocyanate group ($-NCO$ group) (compound (a)) may be used alone, or two or more may be used in combination. That is, compound (a) may be used as a composition containing one or two or more compounds (a) (hereinafter sometimes referred to as composition (A)).

An example of the compound having an isocyanate group, which is compound (a), may be a polyisocyanate. Herein, the polyisocyanate means a compound having two or more isocyanate groups within the molecule. Compound (a) may be a polyisocyanate obtained by trimerizing a diisocyanate. The polyisocyanate obtained by trimerizing a diisocyanate may be a triisocyanate. The polyisocyanate that is a trimer of a diisocyanate may be present as a polymer in which polyisocyanates are polymerized.

The diisocyanate is not limited, and examples include diisocyanates in which an isocyanate group is bonded to an aliphatic group, such as trimethylene diisocyanate, hexamethylene diisocyanate, isophorone diisocyanate, xylylene diisocyanate, hydrogenated xylylene diisocyanate, cyclohexane diisocyanate, dicyclohexylmethane diisocyanate, and norbornane diisocyanate; and diisocyanates in which an isocyanate group is bonded to an aromatic group, such as tolylene diisocyanate, diphenylmethane diisocyanate, polymethylene polyphenyl polyisocyanate, tolidine diisocyanate, and naphthalene diisocyanate.

Specific examples of polyisocyanates include, but are not limited to, compounds having the following structure.

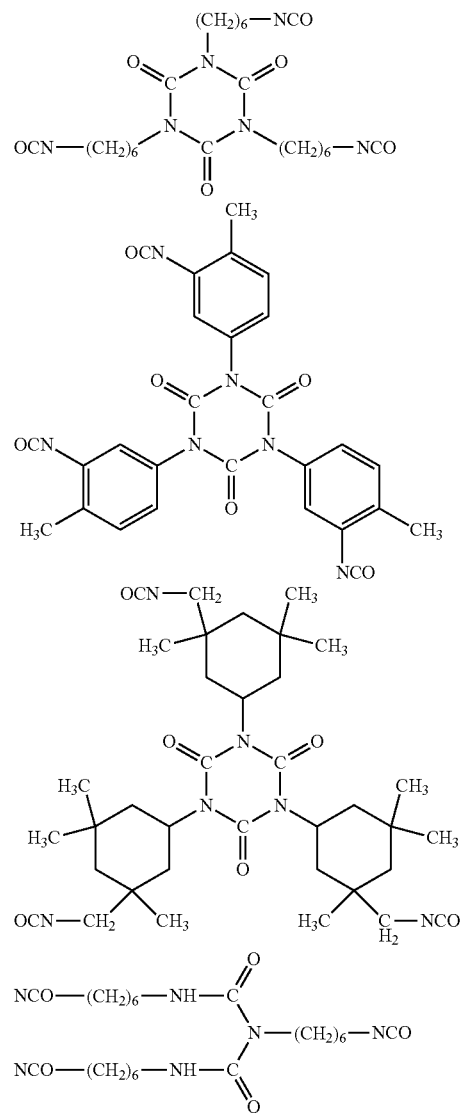

These polyisocyanates may be present as polymers. For example, when the polyisocyanate is an isocyanurate-type polyisocyanate of hexamethylene diisocyanate, the polyisocyanate may have a polymer having the following structure.

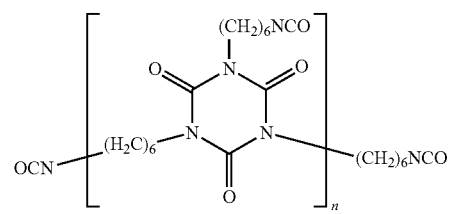

In a preferable embodiment, compound (a) is an isocyanurate-type polyisocyanate.

The isocyanurate-type polyisocyanate may be a polymer in which polyisocyanates are polymerized. The isocyanurate-type polyisocyanate may be a monocyclic compound having only one isocyanurate ring, or may be a polycyclic compound obtained by polymerizing the monocyclic compound.

In one embodiment, composition (A) is a mixture containing a monocyclic compound having only one isocyanurate ring (compound (a)).

In another embodiment, composition (A) contains compound (a) that is an isocyanurate-type polyisocyanate. The isocyanurate-type polyisocyanate may be, for example, a triisocyanate and, specifically, it may be a triisocyanate obtained by trimerizing a diisocyanate.

In the present embodiment, composition (A) may contain a triisocyanate obtained by trimerizing a diisocyanate in an amount of preferably 40% by mass or more, more preferably 50% by mass or more, further preferably 60% by mass or more, and further preferably 65% by mass or more based on the total mass of composition (A). Composition (A) contains a polyisocyanate obtained by di- to penta-merizing a diisocyanate in an amount of preferably 60% by mass or more, more preferably 70% by mass or more, further preferably 80% by mass or more, and further preferably 85% by mass or more based on the total mass of composition (A). The upper limit of the content of a polyisocyanate obtained by di- to penta-merizing a diisocyanate is not limited, and may be, for example, 99% by mass or less or 95% by mass or less based on the total of composition (A). Composition (A) contains a polyisocyanate obtained by at least hepta-merizing a diisocyanate in an amount of preferably 40% by mass or less, more preferably 30% by mass or less, further preferably 20% by mass or less, and further preferably 10% by mass or less based on the total of composition (A). Composition (A) contains a polyisocyanate obtained by at least nona-merizing a diisocyanate in an amount of preferably 25% by mass or less, more preferably 20% by mass or less, further preferably 10% by mass or less, and further preferably 5% by mass or less based on the total of composition (A). The composition of the diisocyanate can be determined in accordance with JIS K 7301-1995, JIS K 1603-1:2007, JIS K 1603-4:2010, or JIS K 6806:2003, or can be analyzed by the FT-IR method.

For example, composition (A) may contain a polyisocyanate obtained by trimerizing a diisocyanate in an amount of 50% by mass or more, a polyisocyanate obtained by 2 to penta-merizing a diisocyanate in an amount of 60% by mass or more, and a polyisocyanate obtained by at least septa-merizing a diisocyanate in an amount of 40% by mass or less, and, more specifically, may contain a polyisocyanate obtained by at least nona-merizing a diisocyanate in an amount of 25% by mass or less, based on the entirety of composition (A). In particular, composition (A) may contain a polyisocyanate obtained by trimerizing a diisocyanate in an amount of 60% by mass or more, a polyisocyanate obtained by di- to penta-merizing a diisocyanate in an amount of 80% by mass or more, and a polyisocyanate obtained by at least septa-merizing a diisocyanate in an amount of 10% by mass or less, and, more specifically, may contain a polyisocyanate obtained by at least nona-merizing a diisocyanate in an amount of 5% by mass or less, based on the total of composition (A). More specifically, composition (A) may contain a polyisocyanate obtained by trimerizing a diisocyanate in an amount of 65% by mass or more, a polyisocyanate obtained by di- to penta-merizing a diisocyanate in an amount of 85% by mass or more, and a polyisocyanate obtained by at least septa-merizing a diisocyanate in an amount of 10% by mass or less, and, more specifically, may contain a polyisocyanate obtained by at least nona-merizing a diisocyanate in an amount of 5% by mass or less, based on the total of composition (A).

Such composition (A) is commercially available as, for example, Sumidur(trademark) N3300 (manufactured by Sumika Covestro Urethane Co., Ltd.), Desmodur(trademark) N3600 (manufactured by Sumika Covestro Urethane Co., Ltd.), Desmodur T, L, IL, HL series (manufactured by Sumika Covestro Urethane Co., Ltd.), Desmodur(trademark) 2460M (manufactured by Sumika Covestro Urethane Co., Ltd.), Sumidur (trademark) 44 series (manufactured by Sumika Covestro Urethane Co., Ltd.), SBU Isocyanate series (manufactured by Sumika Covestro Urethane Co., Ltd.), Desmodur(trademark) E, M series (manufactured by Sumika Covestro Urethane Co., Ltd.), Sumidur HT (manufactured by Sumika Covestro Urethane Co., Ltd.), Desmodur N series (manufactured by Sumika Covestro Urethane Co., Ltd.), Desmodur Z4470 series (manufactured by Sumika Covestro Urethane Co., Ltd.), Duranate TPA-100 (manufactured by Asahi Kasei Corporation), Duranate TKA-100 (manufactured by Asahi Kasei Corporation), Duranate 24A-100 (manufactured by Asahi Kasei Corporation), Duranate 22A-75P (manufactured by Asahi Kasei Corporation), and Duranate P301-75E (manufactured by Asahi Kasei Corporation).

The content of the isocyanate group contained in composition (A) is, for example, 5% by mass or more, 10% by mass or more, and specifically 20% by mass or more based on the total mass of composition (A). The upper limit of the isocyanate group content is, for example, 60% by mass or less and 50% by mass or less. The isocyanate group content can be determined in accordance with, for example, JIS K 7301-1995, JIS K 1603-4:2010, or JIS K 6806:2003, or can be analyzed by the FT-IR method.

The viscosity at 25° C. of composition (A) is preferably 3000 mPa·s or less, more preferably 2800 mPa·s or less, further preferably 2000 mPa·s or less, and particularly preferably 1500 mPa·s or less. The lower limit of the viscosity is not limited and is, for example, 1 mPa·s or more and specifically 3 mPa·s or more. The viscosity can be measured at 25° C. with a B-type viscometer, such as a TV-10 viscometer manufactured by Toki Sangyo Co., Ltd., using a solution containing 20% by mass of composition (A) as well as 50% by mass of Zeorora H and 30% by mass of propylene glycol monomethyl ether (PGME) as solvents. The above numerical values are values measured in accordance with JIS Z 8803:2011.

[(B) Composition Containing Compound Having Active Hydrogen]

The composition containing a compound having an active hydrogen (hereinafter sometimes referred to as composition (B)) will now be described.

Composition (B) preferably contains the following two components: (b1) a compound having active hydrogen and a perfluoropolyether group and (b2) a monomer containing active hydrogen and a carbon-carbon double bond. More preferably, composition (B) further contains (b3) another compound having active hydrogen.

The term "active hydrogen" as used herein means a hydrogen atom that can be donated to an isocyanate group as a proton. Examples of the group containing active hydrogen include an —OH group, a —C(=O)H group, an —SH group, an —SO$_3$H group, an —SO$_2$H group, an —SOH group, an —NH$_2$ group, an —NH— group, and an —SiH group. For example, when active hydrogen contained in composition (B) is an —OH group, a urethane bond is formed from a reaction between compound (a) and compounds (b1) and (b2) (or compounds (b1) to (b3)).

In composition (B) and composition (A), the number of moles of active hydrogen in composition (B) is preferably equal to the number of moles of the isocyanate group in composition (A). For example, when there is only one functional group having active hydrogen in composition (B), the number of moles of compounds (b1) and (b2) (or compounds (b1) to (b3)) contained in composition (B) is preferably equal to the number of moles of the isocyanate group in compound (a).

[(b1) Compound Having Active Hydrogen and Perfluoropolyether Group]

Compound (b1) may be used alone, or two or more may be used in combination. Compound (b1) is a compound containing active hydrogen and a perfluoropolyether group, and may be, for example, a compound having a group containing one active hydrogen at one molecular terminal, such as a hydroxyl group, in addition to having a perfluoropolyether group. Compound (b1) is a compound containing active hydrogen and a perfluoropolyether group, and may be, for example, a compound having a group containing one active hydrogen at each of the two molecular terminals, such as a hydroxyl group, in addition to having a perfluoropolyether group. Compound (b1) is more preferably a compound having a group containing one active hydrogen at one molecular terminal, such as a hydroxyl croup, in addition to having a perfluoropolyether group. A description of the perfluoropolyether group is omitted as it is provided above.

The number average molecular weight of compound (b1) is not limited and is 500 to 12,000, preferably 1,000 to 10,000, and more preferably 1,500 to 8,000. The number average molecular weight shall be a value measured by $^{19}$F-NMR.

Preferably, compound (b1) may be at least one compound represented by either of the following general formulae (b1-i) and (b1-ii):

  (b1-i)

  (b1-ii)

wherein PFPE is as described above.

In formulae (b1-i) and (b1-ii), $Rf^1$ represents a $C_{1-16}$ alkyl group (e.g., linear or branched) optionally substituted with one or more fluorine atoms, and is preferably a $C_{1-3}$ linear or branched alkyl group optionally substituted with one or more fluorine atoms. Preferably, $Rf^1$ is linear. Preferably, the alkyl group optionally substituted with one or more fluorine atoms is a fluoroalkyl group wherein the terminal carbon atom is $CF_2H$— and all other carbon atoms are fully substituted with fluorine or a perfluoroalkyl group, more preferably a perfluoroalkyl group, and specifically —$CF_3$, —$CF_2CF_3$, or —$CF_2CF_2CF_3$.

In formulae (b1-i) and (b1-ii), $R^1$ is each independently a group represented by the following formula:

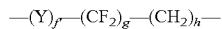

wherein Y is a divalent polar group. Examples of the divalent polar group include, but are not limited to, —COO—, —OCO—, —CONH—, —OCH$_2$CH(OH)CH$_2$—, —CH$_2$CH(OH)CH$_2$O—, —COS—, —SCO—, and —O—, and the divalent polar group is preferably —COO—, —CONH—, —CH$_2$CH(OH)CH$_2$O—, or —O—. In the formula, f, g, and h are each independently an integer of 0 to 50 and preferably 0 to 20 such as 1 to 20, and the sum of f, g, and h is at least 1 and preferably 1 to 10. More preferably, f, g, and h are integers of 0 to 2, and further preferably f=0 or 1, g=2, and h=0 or 1. The occurrence order of the respective repeating unit enclosed in parentheses provided with subscripts f, g, and h is not limited in the formula.

In a preferable embodiment, compound (b1) contains a compound represented by formula (b1-i) in an amount of 25 to 100% by mass based on the total of compound (b1). More preferably, compound (b1) is substantially free of a compound represented by formula (b1-ii). The phrase "substantially free of a compound represented by formula (b1-ii)" means that the compound represented by formula (b1-ii) may not be contained at all or the compound represented by formula (b1-ii) may be contained only a minute amount. For example, the content of a compound represented by formula (b1-ii) in compound (b1) that is substantially free of a compound represented by formula (b1-ii) based on the total of compound (b1) is preferably 1% by mass or less, more preferably 1000 mass ppm or less, further preferably 100 mass ppm or less, and particularly preferably 0 mass ppm. The content of the compound represented by formula (b1-ii) can be measured by high pressure liquid chromatography (HPLC) (such as reverse phase HPLC) or NMR (such as 19F-NMR).

When the content of a compound represented by formula (b1-ii) in compound (b1) is decreased, it possible to suppress the content of a structure (such as a crosslinking structure) in which one compound represented by formula (b1-ii) is bonded to two compounds (a), and makes it possible to suppress an excessively increased molecular weight of component β.

[(b2) Monomer Containing Active Hydrogen and Carbon-Carbon Double Bond]

Compound (b2) may be used alone, or two or more may be used in combination. Monomer (b2) having active hydrogen and a carbon-carbon double bond is preferably (meth)acrylic acid ester or a vinyl monomer having active hydrogen, or a hydroxyl group in particular. Specific examples of monomer (b2) include:

(wherein $R^{12}$ is a hydrogen atom, a chlorine atom, a fluorine atom, or a $C_{1-10}$ alkyl group optionally substituted with fluorine, and i=1 to 10) such as 2-hydroxyethyl (meth)acrylate and 4-hydroxybutyl (meth)acrylate;

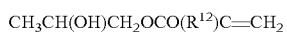

(wherein $R^{12}$ is a hydrogen atom, a chlorine atom, a fluorine atom, or a $C_{1-10}$ alkyl group optionally substituted with fluorine) such as 2-hydroxypropyl (meth)acrylate;

(wherein $R^{12}$ is a hydrogen atom, a chlorine atom, a fluorine atom, or a $C_{1-10}$ alkyl group optionally substituted with fluorine) such as 2-hydroxybutyl (meth)acrylate;

(wherein $R^{12}$ is a hydrogen atom, a chlorine atom, a fluorine atom, or a $C_{1-10}$ alkyl group optionally substituted with fluorine) such as 2-hydroxy-3-phenoxylpropyl (meth)acrylate;

(wherein $R^{12}$ is a hydrogen atom, a chlorine atom, a fluorine atom, or a $C_{1-10}$ alkyl group optionally substituted with fluorine) such as pentaerythritol triacrylate;

C(CH$_2$OCO(R$^{12}$)C=CH$_2$)$_3$CH$_2$OCH$_2$C(CH$_2$OCO(R$^{12}$)C=CH$_2$)$_2$CH$_2$OH (wherein R$^{12}$ is a hydrogen atom, a chlorine atom, a fluorine atom, or a C$_{1-10}$ alkyl group optionally substituted with fluorine) such as dipentaerythritol polyacrylate;

HOCH$_2$CH$_2$OCOC$_6$H$_4$COOCH$_2$CH$_2$OCO(R$^{12}$)C=CH$_2$ (wherein R$^{12}$ is a hydrogen atom, a chlorine atom, a fluorine atom, or a C$_{1-10}$ alkyl group optionally substituted with fluorine) such as 2-acryloyloxyethyl-2-hydroxyethyl phthalate;

H(OCH$_2$CH$_2$)$_{n11}$OCO(R$^{12}$)C=CH$_2$ (wherein n11 is 1 to 30, and R$^{12}$ is a hydrogen atom, a chlorine atom, a fluorine atom, or a C$_{1-10}$ alkyl group optionally substituted with fluorine) such as poly(ethylene glycol) acrylate;

H(OCH(CH$_3$)CH$_2$)$_{n11}$OCO(R$^{12}$)C=CH$_2$ (wherein n11 is 1 to 30, and R$^{12}$ is a hydrogen atom, a chlorine atom, a fluorine atom, or a C$_{1-10}$ alkyl group optionally substituted with fluorine) such as poly(propylene glycol) acrylate;

HO(CH$_2$)$_k$CH=CH$_2$ (k=1 to 20);

(CH$_3$)$_3$SiCH(OH)CH=CH$_2$; and styrylphenol.

In another embodiment, compound (b2) is a monomer having active hydrogen and a group having at least two carbon-carbon double bonds, and the molecular terminal thereof has at least one, and preferably one, active hydrogen-containing group that is preferably a hydroxyl group.

In the present embodiment, compound (b2) preferably has at least three carbon-carbon double bonds. For example, compound (b2) may have at least four or at least five carbon-carbon double bonds.

In the present embodiment, compound (b2) preferably has a group represented by the following group as a group having a carbon-carbon double bond:

—OC(O)—CR$^2$=CH$_2$

In the above formula, R$^2$ is a hydrogen atom, chlorine atom, a fluorine atom, or a C$_{1-10}$ alkyl group optionally substituted with fluorine, preferably a hydrogen atom or a C$_{1-3}$ alkyl group, and more preferably a hydrogen atom or a methyl group. Here, groups in which R$^2$ is a hydrogen atom or a methyl group, i.e., —OC(O)—CH=CH$_2$ or OC(O)—CCH$_3$=CH$_2$, are collectively referred to as "(meth)acrylate groups".

In the present embodiment, compound (b2) is preferably at least one compound selected from the group consisting of:

HO—CH$_2$—C(CH$_2$—OC(O)—CR$^2$=CH$_2$)$_3$; or

HO—CH$_2$—C(CH$_2$—OC(O)—CR$^2$=CH$_2$)$_2$—CH$_2$OCH$_2$—C(CH$_2$—OC(O)—CR$^2$=CH$_2$)$_3$

HO—CH(CH$_2$—OC(O)—CR$^2$=CH$_2$)$_2$

HO—Y$^1_p$—CH$_2$CH$_2$—Q(CH$_2$CH$_2$O—Y$^2_p$—CO—CR$^2$=CH$_2$)$_2$

HO—Y$^2_p$—CH$_2$—C(CH$_2$O—Y$^2_p$—CO—CR$^2$=CH$_2$)$_3$, or

HO—Y$^2_p$—CH$_2$—C(CH$_2$—O—Y$^2_p$—C(O)—CR$^2$=CH$_2$)$_2$—CH$_2$OCH$_2$—C(CH$_2$—O—Y$^2_p$—C(O)—CR$^2$=CH$_2$)$_3$, (wherein R$^2$ is as defined above, Q is a group represented by:

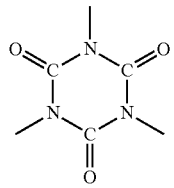

Y$^1$ is —CO—(CH$_2$)$_5$—O—;
Y$^2$ is each independently —CH$_2$CH$_2$O— or CH$_2$CH(CH$_3$)O—; and
p is each independently an integer of 0 to 2, and preferably 0 or 1).

In the present embodiment, compound (b2) is specifically at least one compound selected from the group consisting of pentaerythritol triacrylate, dipentaerythritol pentaacrylate, 2-hydroxy-3-methacrylpropyl acrylate, 2-hydroxyethyl bis(2-acryloxyethyl)isocyanurate, caprolactone-modified 2-hydroxyethyl bis(2-acryloxyethyl)isocyanurate, ethoxylated pentaerythritol triacrylate, propoxylated pentaerythritol triacrylate, ethoxylated dipentaerythritol pentaacrylate, propoxylated dipentaerythritol pentaacrylate, ethoxylated pentaerythritol trimethacrylate, propoxylated pentaerythritol trimethacrylate, ethoxylated dipentaerythritol pentaacrylate, and propoxylated dipentaerythritol pentaacrylate.

In the present embodiment, compound (b2) is more preferably at least one compound selected from the group consisting of pentaerythritol triacrylate and dipentaerythritol pentaacrylate.

In one embodiment, compound (b) is composed of compound (b1) and compound (b2).

[(b3) Another Compound Having Active Hydrogen]

Compound (b3) may be used alone, or two or more may be used in combination. Another compound (b3) having active hydrogen is preferably a compound having neither a perfluoropolyether group nor a carbon-carbon double bond and having at least one active hydrogen. Compound (b3) may be a compound having one active hydrogen-containing group, such as a hydroxyl group, at one molecular terminal or one active hydrogen-containing group, such as a hydroxyl group, at each of the two terminals. From the viewpoint of further suppressing the molecular weight of component β, compound (b3) is more preferably a compound having one active hydrogen-containing group, such as a hydroxyl group, at one molecular terminal.

Preferable examples of compound (b3) include:
a monovalent alcohol consisting of a linear or branched hydrocarbon having 1 to 16 carbon atoms,
a secondary amine consisting of a linear or branched hydrocarbon having 1 to 16 carbon atoms,
an secondary amine having an aromatic group,
an Rf alcohol: Q(CF$_2$)$_l$(CH=CH)$_m$(CHI)$_n$(CH$_2$)$_o$OH (wherein Q is a hydrogen atom, a fluorine atom, or a (CF$_3$)$_2$CF— group, l is an integer of 1 to 10, m and n are each independently 0 or 1, and o is an integer of 1 to 10),
a polyalkylene glycol monoester: such as R$^3$(OCH$_2$CH$_2$)$_p$OH and R$^3$(OCH$_2$CH$_2$CH$_2$)$_q$OH (wherein R$^3$ is a linear or branched hydrocarbon having 1 to 16 carbon atoms, an acetyl group, or an alkylphenoxy group, and p and q are each independently an integer of 1 to 20), an aromatic alcohol, and a silane compound having active hydrogen.

The silane compound having active hydrogen is a compound having one active hydrogen-containing group, such as a hydroxyl group, at one molecular terminal or one active hydrogen-containing group, such as a hydroxyl group, at each of the two terminals. Specific examples of the silane compound having active hydrogen include $(CH_3)_3Si(CH_2)_{s1}OH$ (s1 is an integer of 1 to 20) and compounds having the following structures. These compounds are more preferably compounds having one active hydrogen-containing group (such as a hydroxyl group or an amino group) at one molecular terminal.

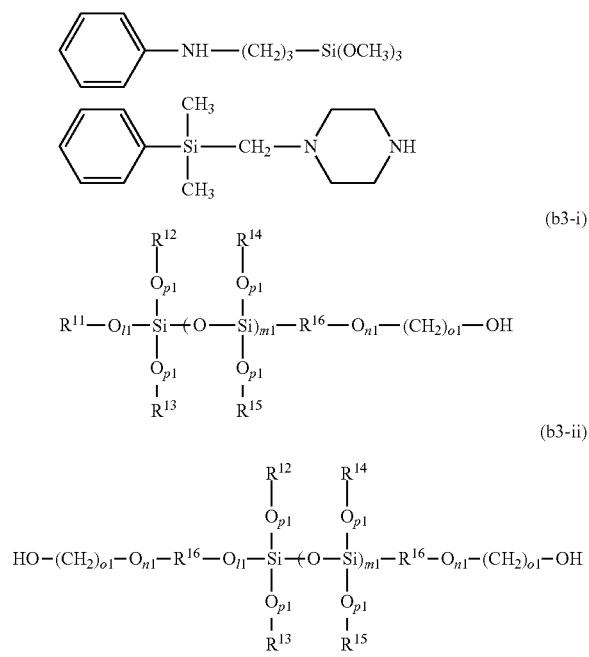

The number average molecular weight of the silane compound having active hydrogen, which is compound (b3), is not limited and may be 100 to 20,000, preferably 500 to 15,000, and more preferably 800 to 12,000.

In formulae (b3-i) and (b3-ii), $R^{11}$, $R^{12}$, $R^{13}$, $R^{14}$, and $R^{15}$ are each independently an alkyl group or an aryl group.

The alkyl group is not limited, and examples include an alkyl group having 1 to 10 carbon atoms and a cycloalkyl group having 3 to 20 carbon atoms, with an alkyl group having 1 to 6 carbon atoms being preferable. The alkyl group may be linear or branched, and is preferably linear. A preferable specific example of $R^{11}$ is a n-butyl group, and a preferable specific example of $R^{12}$ to $R^{15}$ is a methyl group.

The aryl group is not limited, and examples include an aryl group having 6 to 20 carbon atoms. The aryl group may contain two or more rings. A preferable aryl group is a phenyl group.

The alkyl group and the aryl group may contain a hetero atom such as a nitrogen atom, an oxygen atom, or a sulfur atom in their molecular chain or ring as desired.

Moreover, the alkyl group and the aryl group may be substituted, as desired, with one or more substituents selected from a halogen; and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10-membered heterocyclyl group, a 5 to 10-membered unsaturated heterocyclyl group, a $C_{6-10}$ aryl group, and a 5 to 10-membered heteroaryl group that may be substituted with one or more halogens.

In formulae (b3-i) and (b3-ii), $R^{16}$ represents a divalent organic group. Preferably, $R^{16}$ is $—(CH_2)_r—$ (wherein r is an integer of 1 to 20 and preferably an integer of 1 to 10).

In formulae (b3-i) and (b3-ii), l1 and n1 are each independently 0 or 1; m1 is an integer of 1 to 500, preferably 1 to 200, and more preferably of 5 to 150; o1 is an integer of 0 to 20 such as an integer of 1 to 20; and p1 is 0 or 1.

Specific examples of the compound represented by formula (b3-i) include the following compounds.

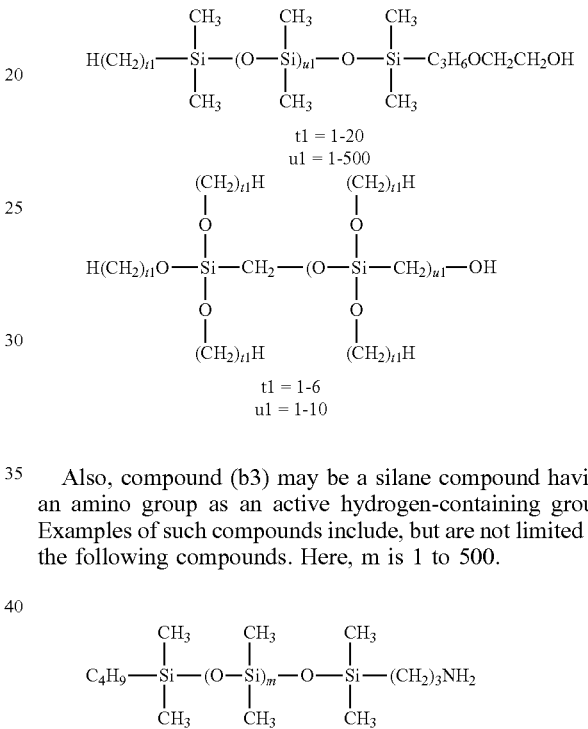

Also, compound (b3) may be a silane compound having an amino group as an active hydrogen-containing group. Examples of such compounds include, but are not limited to, the following compounds. Here, m is 1 to 500.

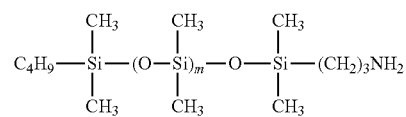

Compounds (b1), (b2), and (b3) may be in the range of 0.1 to 2 moles, 5 to 8.85 moles, and 0.05 to 2 moles, respectively, based on 9 moles of the isocyanate group in the compound having a perfluoropolyether group and a curable site.

In one embodiment, component β preferably contains a structure in which $—NHC(=O)—$, which is a moiety derived from the isocyanate group of compound (a), is bound to a moiety obtained by removing of active hydrogen from compound (b). More preferably, component β comprises an $R_{x1}—C(=O)NH—$ structure and an $R_{x2}—C(=O)NH—$ structure. Here, $C(=O)$ represents a carbonyl group. For example, $R_{x1}$ is a structure derived from compound (b1) and is $Rf^1—PFPE-R^1—CH_2O—$ or $HOCH_2—R^1—PFPE-R^1—CH_2O—$; and $R_{x2}$ is a structure derived from monomer (b2) and is a structure represented by any of the following formulae:

$CH_2\!=\!C(R^{12})COOCH_2CH(CH_2CH_3)O\!-\!,$ $CH_2\!=\!C(R^{12})COOCH_2CH(CH_2OC_6H_5)O\!-\!,$ $(CH_2\!=\!C(R^{12})COOCH_2)_3CCH_2O\!-\!,$ $C(CH_2COO(R^{12})C\!=\!CH_2)_3CH_2OCH_2C(CH_2OCO(R^{12})C\!=\!CH_2)_2CH_2O\!-\!,$ $CH_2\!=\!C(R^{12})COOCH_2CH_2OCOC_6H_4COOCH_2CH_2O\!-\!,$ $CH_2\!=\!C(R^{12})COO(CH_2CH_2O)_{n11}\!-\!,$ $CH_2\!=\!C(R^{12})COO(CH_2CH(CH_3)O)_{n11}\!-\!,$ $CH_2\!=\!CH(CH_2)_kO\!-\!,$ $CH_2\!=\!CHCH(Si(CH_3)_3)O\!-\!,$ or

Ar-Ph-O—. Here, Ph is a benzene ring in which some hydrogen atoms may be substituted, and Ar is a structure having at least a styryl group. $R^1R^{12}$, $Rf^1$, n11, i, k, and PFPE are as described above.

The specific structure of component β of the present embodiment is not limited, and an example may be what is shown below.

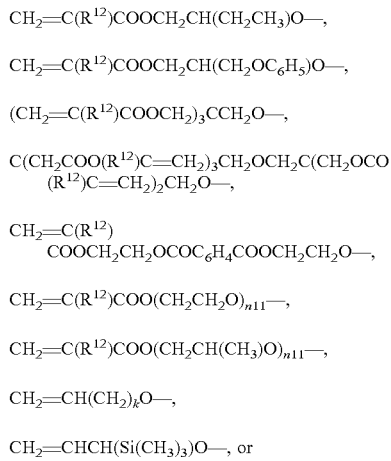

Here, $R_{x11}$, $R_{x12}$, and $R_{x13}$ are each independently $R_{x2}$, or $R_{x3}$; at least one of $R_{x11}$, $R_{x12}$, and $R_{x13}$ is $R_{x1}$; and at least one of $R_{x11}$, $R_{x12}$, and $R_{x13}$ is $R_{x2}$. $R_{y1}$, $R_{y2}$, and $R_{y3}$ are each independently an alkylene group having 1 to 10 carbon atoms, preferably —$(CH_2)_{n5}$— (wherein n5 is an integer of 1 to 10, preferably an integer of 3 to 6, and typically 6), or structures shown below.

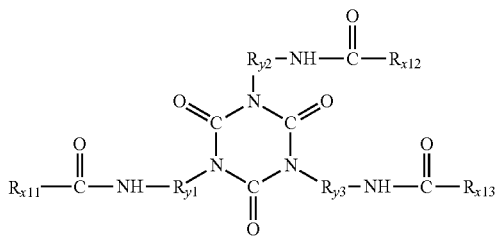

Here, * represents a bond. $R_{x1}$ and $R_{x2}$ are as described above. $R_{x3}$ is a structure obtained by removing of active hydrogen from compound (b3).

In a molecular weight distribution curve obtained using GPC of composition α of the present invention, the following formula is satisfied:

M2/M1≤3.5

(wherein M1 is a molecular weight at a main peak, and M2 is a molecular weight at 25% intensity of the intensity of the main peak on the higher molecular weight side than M1). Specifically, as shown in FIG. 1, M1 is a molecular weight at a main peak. M2 is a molecular weight that is higher than M1 and the intensity h2 is 25% of the peak intensity h1 of M1. When there are a plurality of molecular weights at 25% intensity of the intensity h1 of the main peak on the higher molecular weight side than the main peak is, M2 is the highest of those molecular weights. In the present invention, M2/M1 (the ratio of M1 to M2) is 3.5 or less, preferably 3.3 or less, more preferably 3.0 or less, and particularly preferably 2.5 or less. That is, in the curable composition of the present invention, the content of a high molecular weight compound is suppressed. Because composition α shows such M2/M1, composition α contributes to formation of a surface-treating layer that is unlikely clouded.

The lower limit of the M2/M1 (the ratio of M1 to M2) may be 1.1, and may exceed 1.0.

The weight average molecular weight can be measured by GPC under the following conditions. The weight average molecular weight may be a converted value when poly (methyl methacrylate) is used as a standard sample. The molecular weight distribution curve is drawn such that the horizontal axis indicates the logarithmic value of the molecular weight, wherein the molecular weight is converted value when poly(methyl methacrylate) is used as a standard sample, and the vertical axis indicates a value obtained by differentiating the concentration fraction by the logarithmic value of the molecular weight. The "peak" means a point having a maximum value on the molecular weight distribution curve, and the "main peak" means the highest peak with respect to the vertical axis (a value obtained by differentiating the concentration fraction by the logarithmic value of the molecular weight) among the peaks of the molecular weight distribution curve (provided that the peak of a solvent is excluded).

(Conditions of GPC Measurement)
Column: KF-806L (manufactured by Viscotek)
Measurement device: Gel permeation chromatography (manufactured by Viscotek)
Detector: Differential refractive index detector TDA-302 (manufactured by Viscotek)
Eluent: HCFC 225 (AK-225 manufactured by Asahi Glass Co., Ltd.)/hexafluoro isopropanol (HFIP) [90/10 (w/w)]
Feeding condition: 0.75 mL/min
Injection volume of measurement sample: 20 mL
Temperature: 30° C.

Above, "90/10 (w/w)" means that the eluent contains 90% by mass of HCFC 225 and 10% by mass of HFIP.

In a more preferable embodiment, in a molecular weight distribution curve obtained using GPC of composition α of the present invention, the following formula is satisfied:

0.45≤M3/M1<1.0

(wherein
M1 is a molecular weight at a main peak, and
M3 is a molecular weight at 25% intensity of the intensity of the main peak on the lower molecular weight side than M1). Specifically, as shown in FIG. 1, M1 is a molecular weight at a main peak. M3 is a molecular weight that is lower than M1 and the intensity h3 is 25% of the peak intensity h1 of M1. When there are a plurality of molecular weights at 25% intensity of the intensity h1 of the main peak on the lower molecular weight side than the main peak, M3 is the lowest of those molecular weights. In the present embodiment, M3/M1 (the ratio of M3 to M1) is more preferably 0.50 or more. That is, in composition α of the present embodiment, not only the content of a high molecular weight compound is suppressed, but also the content of a low molecular weight compound is suppressed. In such composition α, the content of a compound on the high molecular weight side and the content of a compound on the low molecular weight side are suppressed, and thus composition α can contribute to formation of a surface-treating layer that is unlikely clouded and that unlikely has cissing, and can have good miscibility with a solvent for diluting composition α.

In another preferable embodiment, the degree of dispersion Mw/Mn (wherein Mw is weight average molecular weight, and Mn is number average molecular weight) of composition α is 1.7 or less, particularly 1.6 or less, and more specifically 1.4 or less or 1.2 or less. In a curable composition containing such composition α, the content of a compound on the high molecular weight side and the content of a compound on the low molecular weight side are suppressed, and the formed surface-treating layer is unlikely clouded and unlikely has cissing, and miscibility with a solvent for diluting the curable composition can be favorable.

The degree of dispersion Mw/Mn may be obtained using GPC. The conditions of GPC measurement are the same as the conditions used in the analysis of composition α.

In another preferable embodiment, the molecular weight distribution curve of composition α obtained using GPC has only one peak. The phrase "has only one peak" means that, for example, there is no peak other than the main peak (provided that the peak of a solvent is excluded). In the present embodiment, the degree of dispersion Mw/Mn of composition α is 1.7 or less, particularly 1.6 or less, and more specifically 1.4 or less or 1.2 or less. In such composition α, the content of a compound on the high molecular weight side and the content of a compound on the low molecular weight side are more suppressed. Such composition α can contribute to formation of a surface-treating layer that is unlikely clouded and that unlikely has cissing, and can have good miscibility with a solvent for diluting composition α.

The viscosity at 25° C. of composition α of the present invention is preferably in the range of 1 to 10000 mPa·s, more preferably in the range of 2 to 1000 mPa·s, and further preferably in the range of 3 to 500 mPa·s, and may be, for example, in the range of 3 to 20 mPa·s. With such a viscosity, composition α can have good handleability and have good miscibility with, for example, a solvent for diluting composition α. This seems to be because, in composition α, the content of a high molecular weight compound is suppressed, and a composition having a relatively narrow molecular weight distribution is obtained.

For measuring the viscosity, a sample having 20% by mass of composition α is prepared and used. The sample contains, in addition to composition α, one or more curable resins, a curable monomer, an organic solvent, or a solvent that dissolves composition α. Usable curable resin, curable monomer, organic solvent, and solvent are as described below, and Zeorora H, propylene glycol monomethyl ether, (3,3,4,4,5,5,6,6,6-nonafluorohexyl)-2-chloroacrylate, and the like are usable. The viscosity can be measured in accordance with JIS Z 8803:2011, and, for example, can be measured at 25° C. using a TV-10 viscometer (manufactured by Toki Sangyo Co., Ltd.) or a vibration viscometer SV-10 manufactured by A&D Company Limited.

[Curable Composition]

The curable composition of the present invention contains composition α. Composition α is as described above. That is, composition α may also be a composition for producing a curable composition.

The curable composition preferably contains composition α in an amount of 0.1 to 95% by mass, more preferably 1 to 70% by mass, and particularly preferably 5 to 40% by mass based on the total of the curable composition.

Bubbles may be generated in a curable composition containing a compound having PFPE and a curable site during handling the composition such as preparation. When there is a bubble, it may be difficult to handle the curable composition. When a curable composition containing a bubble is used, it may form a coating with cissing. Accordingly, it is preferable that the bubbles may be unlikely generated in the curable composition, or the bubbles promptly disappear even if the bubbles are generated. With the curable composition of the present invention, the bubbles can disappear, for example, in 1 to 600 seconds, and specifically in 1 to 120 seconds. As described above, the generated bubbles easily disappear in the curable composition of the present invention, thus making it relatively easy to handle the curable composition of the present invention. A coating formed of the curable composition of the present invention unlikely has cissing. This seems to be because in the curable composition of the present invention, the content of a high molecular weight compound is suppressed as described above, and thus the bubbles are unlikely maintained and likely disappear as described above. The degree of the disappearance of the bubbles can be measured in accordance with A.S.T.M. Standard D 3519-85 or the foaming test method of JIS K 2241:2000.

The curable composition of the present invention may contain other compounds in addition to composition α. Examples of other compounds include a catalyst (or metal atom derived from catalysts), a fluorine-containing oil, a curable resin and/or a curable monomer, an organic solvent, an active energy ray curing initiator, a photoacid generator, a surfactant, a polymerization inhibitor, and a sensitizer.

Examples of catalysts include those commonly used in the reaction of compound (a), which will be described below, with compounds (b1) to (b3). A catalyst containing a metal atom is preferably used. Examples of metal atoms include a tin atom, a titanium atom, a zirconium atom, a zinc atom, a platinum atom, a rhodium atom, a ruthenium atom, an iridium atom, and a palladium atom. For example, a compound containing a tin atom, a compound containing a titanium atom, or a compound containing a zirconium atom or a zinc atom is used. Examples of the compound containing a tin atom include dibutyltin dilaurate, dibutyltin dioctoate, tin octanoate, dioctyltin diacetate, dioctyltin dilaurate, and dioctyltin dioctoate. Examples of the compound containing a titanium atom include titanic acid esters and titanium chelate compounds such as tetraisopropoxytitanium, tetra-n-butoxytitanium, tetrakis(2-ethylhexoxy)titanium, dipropoxybis(acetylacetona)titanium, and titanium isopropoxyoctyleneglycol. Examples of the compound containing a zirconium atom include zirconium tetraacetylacetonate, zirconium tributoxy monoacetylacetonate, zirconium monobutoxy acetylacetonate bis(ethylacetoacetate), zirconium dibutoxy bis(ethylacetoacetate), zirconium tetraacetylacetonate, and zirconium chelate compounds. An example of the compound containing a zinc atom may be zinc octylate.

In one embodiment, the curable composition is substantially free of a catalyst-derived metal atom. Examples of the catalyst-derived metal atom include a tin atom, a titanium atom, a zirconium atom, a zinc atom, and a platinum atom. The phrase "substantially free of a catalyst-derived metal atom" means that the tin atom, titanium atom, and zirconium atom may not be contained at all, or the catalyst-derived metal atom may be contained only a minute amount. For example, the content of the catalyst-derived metal atom (such as a tin atom, a titanium atom, or a zirconium atom) in the curable composition of the present invention that is substantially free of the catalyst-derived metal atom (such as a tin atom, a titanium atom, or a zirconium atom) is preferably 100 mass ppm or less, more preferably 10 mass ppm or less, further preferably 1 mass ppm or less, and particularly preferably equal to or less than the detection limit, per 100% by mass of the curable composition. The curable composition of the present invention is substantially free of the catalyst-derived metal atom and is thus capable of preventing the surface-treating layer formed of the curable composition of the present invention from being clouded and suppressing the progress of a reaction catalyzed by the catalyst-derived metal atom in the surface-treating layer. In one embodiment, the curable composition, of the present invention is substantially free of a tin atom, a titanium atom, and a zirconium atom.

In the present embodiment, preferably composition α is substantially free of a catalyst-derived metal atom. The phrase "substantially free of a catalyst-derived metal atom" means that the catalyst-derived metal atom may not be contained at all, or the catalyst-derived metal atom may be contained only a minute amount.

The content of a tin atom, a titanium atom, or a zirconium atom can be measured, for example, using an atomic absorption spectrometer.

A (non-reactive) fluoropolyether compound that can be understood as a fluorine-containing oil and preferably a perfluoro(poly)ether compound (hereinafter referred to as a "fluorine-containing oil") are not limited, and examples include compounds represented by general formula (3) (perfluoro(poly)ether compounds) below:

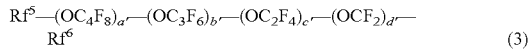

(3)

wherein $Rf^5$ represents a $C_{1-16}$ alkyl group optionally substituted with one or more fluorine atoms (preferably a $C_{1-16}$ perfluoroalkyl group), $Rf^6$ represents a $C_{1-16}$ alkyl group optionally substituted with one or more fluorine atoms (preferably a $C_{1-16}$ perfluoroalkyl group), a fluorine atom, or a hydrogen atom, and more preferably $Rf^5$ and $Rf^6$ are each independently a $C_{1-3}$ perfluoroalkyl group.

a', b', c', and d' respectively represent the numbers of four perfluoro(poly)ether repeating units constituting the main backbone of the polymer and are each independently an integer of 0 or more and 300 or less, and the sum of a', b', c', and d' is at least 1, preferably 1 to 300, and more preferably 20 to 300. The occurrence order of the respective repeating unit enclosed in parentheses provided with subscripts a', b', c', or d' is not limited in the formula. Among these repeating units, —(OC$_4$F$_8$)— may be any of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)— and (OCF$_2$CF(C$_2$F$_5$))—, and is preferably —(OCF$_2$CF$_2$CF$_2$CF$_2$)—. —(OC$_3$F$_6$)— may be any of —(OCF$_2$CF$_2$CF$_2$)—, —(OCF(CF$_3$)CF$_2$)—, and (OCF$_2$CF(CF$_3$))—, and is preferably —(OCF$_2$CF$_2$CF$_2$)—. —(OC$_2$F$_4$)— may be any of —(OCF$_2$CF$_2$)— and (OCF(CF$_3$))—, and is preferably —(OCF$_2$CF$_2$)—.

Examples of the perfluoro(poly)ether compound represented by general formula (3) includes compounds (which may be a mixture of one or two or more) represented by either general formula (3a) or (3b) below:

(3a)

(3b)

wherein $Rf^5$ and $Rf^6$ are as described above; in formula (3a), b" is an integer of 1 or more and 100 or less; and in formula (3b), a" and b" are each independently an integer of 0 or more and 30 or less, and c" and d" are each independently an integer of 1 or more and 300 or less. The occurrence order of the respective repeating unit enclosed in parentheses provided with subscripts a", b", c", or d" is not limited in the formula.

From another viewpoint, the fluorine-containing oil may be a compound represented by general formula $Rf^3$—F (wherein $Rf^3$ is a $C_{5-16}$ perfluoroalkyl group). It may be a chlorotrifluoroethylene oligomer.

The fluorine-containing oil may be a by-product possibly produced during production of compound (b1), or may be a compound separately added to the curable composition.

The fluorine-containing oil may have an average molecular weight of 500 to 10000. The molecular weight of the fluorine-containing oil can be measured using GPC.

In the curable composition, the fluorine-containing oil may be contained in an amount of, for example, 0 to 50% by mass, preferably 0 to 30% by mass, and more preferably 0 to 5% by mass based on the total of composition α. More preferably, the curable composition of the present invention is substantially free of the fluorine-containing oil. The phrase "substantially free of the fluorine-containing oil" means that the fluorine-containing oil may not be contained at all, or the fluorine-containing oil may be contained only a minute amount. The content of the fluorine-containing oil may be reduced from the curable composition or from a compound or a component contained in the curable composition using, for example, preparative column chromatography.

The curable resin may be either a photocurable resin or a thermosetting resin. The curable resin is not limited as long as it has heat resistance and strength suitable for the purpose, and is preferably a photocurable resin, in particular, a UV curable resin. The curable resin and the curable monomer can be used in combination as necessary.

Examples of the curable resin include an acrylic polymer, a polycarbonate polymer, a polyester polymer, a polyamide polymer, a polyimide polymer, a polyethersulfone polymer, a cyclic polyolefin polymer, a fluorine-containing polyolefin polymer (such as PTFE), and a fluorine-containing cyclic non-crystalline polymer (such as Cytop(trademark) and Teflon(trademark) AF). These resins correspond to both thermosetting resins and photocurable resins. These curable resins are transparent to ultraviolet radiation, and thus can be preferably used when the resins are cured by being irradiated with ultraviolet light.

Specific examples of the curable resin or the curable monomer constituting the curable resin include alkyl vinyl ethers such as cyclohexylmethyl vinyl ether, isobutyl vinyl ether, cyclohexyl vinyl ether, and ethyl vinyl ether, glycidyl vinyl ether, vinyl acetate, vinyl pivalate, monomers containing an acryloyl group, such as (meth)acryloyl morpholine and various (meth)acrylates: and phenoxyethyl acrylate, benzyl acrylate, stearyl acrylate, lauryl acrylate, 2-ethylhexyl acrylate, allyl acrylate, 1,3-butanediol diacrylate, 1,4-butanediol diacrylate, 1,6-hexanediol diacrylate, trimethylol propane triacrylate, pentaerythritol triacrylate, dipentaerythritol hexaacrylate, ethoxyethyl acrylate, methoxyethyl acrylate, glycidyl acrylate, tetrahydrofurfuryl acrylate, diethylene glycol diacrylate, neopentyl glycol diacrylate, polyoxyethylene glycol diacrylate, tripropylene glycol diacrylate, 2-hydroxyethyl acrylate, 2-hydroxypropyl acrylate, 4-hydroxybutyl vinyl ether, N,N-diethylaminoethyl acrylate, N,N-dimethylaminoethyl acrylate, N-vinylpyrrolidone, dimethylaminoethyl methacrylate silicone acrylate, maleic anhydride, vinylene carbonate, polyacrylate with linear side chain, polyacrylate polynorbornene with cyclic side chain, polynorbornadiene, polycarbonate, polysulfonic acid amide, and fluorine-containing cyclic non-crystalline polymers (such as Cytop(trademark) and Teflon(trademark) AF). The curable resin can be used after being heated into a liquid form as necessary.

The curable monomer may be either a photocurable monomer or a thermosetting monomer, and is preferably a photocurable monomer, or an ultraviolet curable monomer in particular.

The curable monomer may be a monomer containing an acryloyl group, and, for example, (meth)acryloyl morpholine and a monomer containing a (meth)acrylate group are usable. An example of (meth)acryloyl morpholine may be 4-acryloyl morpholine. Examples of the monomer containing a (meth)acrylate group include urethane (meth)acrylate, epoxy (meth)acrylate, polyester (meth)acrylate, polyether (meth)acrylate, silicon (meth)acrylate, a (meth)acrylate monomer, and an alkoxysilane group-containing (meth)acrylate monomer.

Specific examples of urethane (meth)acrylate include poly[(meth)acryloyloxyalkyl] isocyanurate represented by tris(2-hydroxyethyl) isocyanurate diacrylate and tris(2-hydroxyethyl) isocyanurate triacrylate.

Epoxy (meth)acrylate is obtained by adding a (meth)acryloyl group to an epoxy group. Bisphenol A, bisphenol F, phenol novolac, or an alicyclic compound is commonly used as a starting material.

Examples of a polyhydric alcohol constituting the polyester moiety of polyester (meth)acrylate include ethylene glycol, 1,4-butanediol, 1,6-hexanediol, diethylene glycol, trimethylolpropane, dipropylene glycol, polyethylene glycol, polypropylene glycol, pentaerythritol, and dipentaerythritol. Examples of polybasic acid include phthalic acid, adipic acid, maleic acid, trimellitic acid, itaconic acid, succinic acid, terephthalic acid, and alkenyl succinic acid.

Examples of polyether (meth)acrylate include polyethylene glycol di(meth)acrylate, polypropylene glycol di(meth)acrylate, and polyethylene glycol-polypropylene glycol di(meth)acrylate.

Silicon (meth)acrylate is modified dimethylpolysiloxane with a (meth)acryloyl group at one or both terminals wherein a molecular weight of dimethylpolysiloxane thereof is 1000 to 10000, and examples include the following compounds.

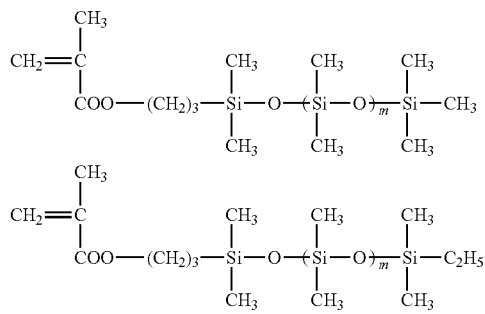

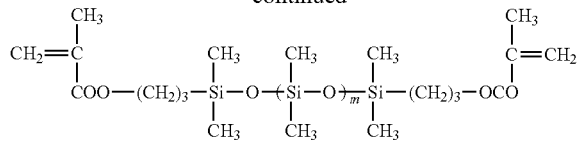

The (meth)acrylate monomer may be either a monofunctional or polyfunctional (meth)acrylate monomer, and examples include methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, n-pentyl (meth)acrylate, 3-methylbutyl (meth)acrylate, n-hexyl (meth)acrylate, 2-ethyl-n-hexyl (meth)acrylate, n-octyl (meth)acrylate, cyclohexyl (meth)acrylate, isobornyl (meth)acrylate, benzyl (meth)acrylate, 2-hydroxyethyl (meth)acrylate, 2-hydroxypropyl (meth)acrylate, 3-hydroxypropyl (meth)acrylate, 4-hydroxybutyl (meth)acrylate, 5-hydroxypentyl (meth)acrylate, 6-hydroxyhexyl (meth)acrylate, 4-hydroxycyclohexyl (meth)acrylate, neopentyl glycol mono (meth)acrylate, (1,1-dimethyl-3-oxobutyl) (meth)acrylate, 2-acetoacetoxyethyl (meth)acrylate, 2-methoxyethyl (meth)acrylate, 2-ethoxyethyl (meth)acrylate, neopentyl glycol mono (math) acrylate, glycerin mono meth)acrylate, ethylene glycol diacrylate, propylene glycol diacrylate, 1,6-hexanediol diacrylate, 1,9-nonanediol diacrylate, 1,10-decanediol diacrylate, trimethylolpropane triacrylate, pentaerythritol tetraacrylate, and a halogen atom-containing (meth)acrylate monomer. Examples of the halogen atom-containing (meth)acrylate monomer include 3-chloro-2-hydroxypropyl (meth)acrylate, 2,2,3,3-tetrafluoropropyl acrylate, octafluoropentyl acrylate, 3,3,4,4,5,5,6,6,7,7,8,8,8-tridecanefluorooctyl acrylate, (3,3,4,4,5,5,6,6,6-nonafluorohexyl)-2-chloroacrylate, and (3,3,4,4,5,5,6,6,7,7,8,8,8-tridecanefluorooctyl)-2-chloroacrylate. The halogen atom-containing (meth)acrylate monomer is preferably a fluorine atom-containing monomer, and more preferably a monomer in which an alkyl group substituted with at least one fluorine atom is bonded to a (meth)acryloyl group.

Examples of the alkoxysilane group-containing (meth)acrylate monomer include 3-(meth)acryloyloxypropyltrichlorosilane, 3-(meth)acryloyloxypropyltrimethoxysilane, 3-(meth)acryloyloxypropyltriethoxysilane, 3-(meth)acryloyloxypropyltriisopropoxysilane (also known as (triisopropoxysilyl)propyl methacrylate (abbreviated as TISMA) and triisopropoxysilyl)propyl acrylate), 3-(meth)acryloxyisobutyltrichlorosilane, 3-(meth)acryloxyisobutyltriethoxysilane, 3-(meth)acryloxyisobutyltriisopropoxysilane, and 3-(meth)acryloxyisobutyltrimethoxysilane.

Preferable commercially available curable resins and curable monomers are as follows.

Examples of curable resins include silicon resins PAK-01 and PAK-02 (manufactured by Toyo Gosei Co., Ltd.), nanoimprint resin NIF series (manufactured by Asahi Glass Co., Ltd.), nanoimprint resin OCNL series (manufactured by Tokyo Ohka Kogyo Co., Ltd.), NIAC 2310 (manufactured by Daicel Chemical Industries Co., Ltd.), epoxy acrylate resins EH-1001, ES-4004, EX-C101, EX-C106, EX-C300, EX-C501, EX-0202, EX-0205, and EX-5000 (manufactured by Kyoeisha Chemical Co., Ltd.), hexamethylene diisocyanate polyisocyanates, and Sumidur N-75, Sumidur N3200, Sumidur HT, Sumidur N3300, and Sumidur N3500 (manufactured by Sumitomo Bayer Urethane Co., Ltd.)

Among the curable monomers, examples of silicon acrylate resins include Silaplane FM-0611, Silaplane FM-0621, and Silaplane FM-0625; bi-terminal (meth)acrylic Silaplane FM-7711, Silaplane FM-7721, and Silaplane FM-7725; Silaplane FM-0411, Silaplane FM-0421, Silaplane FM-0428, Silaplane FM-DA11, Silaplane FM-DA21, Silaplane DA25; and mono-terminal (meth)acrylic Silaplane FM-0711, Silaplane FM-0721, Silaplane FM-0725, Silaplane TM-0701, and Silaplane TM-0701T (manufactured by JCN Corporation). The term "(meth)acrylic" means methacrylic and/or acrylic.

Examples of polyfunctional acrylates include A-9300, A-9300-1CL, A-GLY-9E, A-GLY-20E, A-TMM-3, A-TMM-3L, A-TMM-3LM-N, ATMPT, and A-TMMT (manufactured by Shin Nakamura Chemical Co., Ltd.).

An example of a polyfunctional methacrylate may be TMPT (manufactured by Shin Nakamura Chemical. Co., Ltd.).

In one embodiment, the molecular weight of the curable monomer is less than 1000.

The content of the curable resin and/or the curable monomer is preferably in the range of 20 to 95% by mass, more preferably in the range of 40 to 90% by mass, and more preferably in the range of 40 to 85% by mass based on the total of the curable composition.

In one embodiment, the curable resin and/or the curable monomer preferably has no PFPE in the molecular structure. For example, the curable monomer may be a monomer containing a (meth)acrylate group that does not have PFPE in the molecular structure.

In one embodiment, composition α contained in the curable composition of the present invention is dissolved in the curable resin and/or the curable monomer. When composition α is dissolved in the curable resin and/or the curable monomer, a more uniform surface-treating layer can be formed. Dissolution refers to a state where no suspended matter is visually observed.

Examples of the organic solvent include solvents that are usable in the synthesis of composition α, which will be described below, and organic solvents shown below that are not radically reactive. Such organic solvents are also usable as diluents for the curable composition.

Specific examples of organic solvents that do not have a radically reactive group include aliphatic hydrocarbons such as hexane, cyclohexane, heptane, octane, nonane, decane, undecane, dodecane, and mineral spirits; aromatic hydrocarbons such as benzene, toluene, xylene, naphthalene, and solvent naphtha; esters such as methyl acetate, ethyl acetate, propyl acetate, n-butyl acetate, isopropyl acetate, isobutyl acetate, cellosolve acetate, propylene glycol methyl ether acetate, carbitol acetate, diethyl oxalate, ethyl pyruvate, ethyl 2-hydroxybutyrate, ethyl acetoacetate, amyl acetate, methyl lactate, ethyl lactate, methyl 3-methoxypropionate, ethyl 3-methoxypropionate, methyl 2-hydroxyisobutyrate, and ethyl 2-hydroxyisobutyrate; ketones such as acetone, methyl ethyl ketone, methyl isobutyl ketone, 2-hexanone, cyclohexanone, methyl amino ketone, and 2-heptanone; glycol ethers such as ethyl cellosolve, methyl cellosolve, methyl cellosolve acetate, ethyl cellosolve acetate, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether, and ethylene glycol monoalkyl ether; alcohols such as methanol, ethanol, isopropanol, n-butanol, isobutanol, tert-butanol, sec-butanol, 3-pentanol, octyl alcohol, 3-methyl-3-methoxybutanol, and tert-amyl alcohol; glycols such as ethylene glycol and propylene glycol; cyclic ethers such as tetrahydrofuran, tetrahydropyran, and dioxane; amides such as N,N-dimethylformamide and N,N-dimethylacetamide; ether alcohols such as methyl cellosolve, cellosolve, isopropyl cellosolve, butyl cellosolve, and diethylene glycol monomethyl ether; diethylene glycol monoethyl ether acetate; and fluorine-containing solvents such as 1,1,2-trichloro-1,2,2-trifluoroethane, 1,2-dichloro-1,1,2,2-tetrafluoroethane, dimethyl sulfoxide, 1,1-dichloro-1,2,2,3,3-pentafluoropropane, Zeorora H, HFE 7100, HFE 7200, and HFE 7300. Alternatively, the organic solvent may be a mixed solvent of two or more of such solvents.

In one embodiment, the curable composition is substantially free of the organic solvent having no radical reactive group. Due to such characteristics, a decrease of heat resistance, a decrease of strength, clouding, and the like resulting from the residual solvent contained in the obtained surface-treating layer unlikely occur.

In the present embodiment, the phrase "substantially free of the organic solvent" means that the organic solvent may not be contained at all, or the organic solvent may be contained only a minute amount. For example, the content of the organic solvent based on the total of the curable composition is preferably 1% by mass or less, more preferably 1000 mass ppm or less, may be further preferably 100 mass ppm or less, and may be particularly preferably 0 mass ppm. By being substantially free of the organic solvent, the surface-treating layer formed after curing the curable composition of the present invention is unlikely clouded, and the surface-treating layer and the base material unlikely separate. Also, by being substantially free of the organic solvent, the amount of the organic solvent volatilized from the curable composition or from the formed surface-treating layer can be reduced, which can contribute to improving work environment as well. Although the base material may shrink and deform during volatilization of the organic solvent, such deformation unlikely occurs with the curable composition of the present embodiment that is substantially free of the organic solvent.

The content of the organic solvent can be measured using, for example, gas chromatography.

The active energy ray curing initiator does not produce a radical, a cation, or the like until being irradiated with, for example, electromagnetic waves in a wavelength region of 380 nm or less, i.e., ultraviolet rays, electron beams, X rays, γ rays, or the like, and serves as a catalyst for initiating the curing (i.e., a crosslinking reaction) of the curable site (such as a carbon-carbon double bond) of a compound in the composition. Usually, those that produce a radical or a cation, or a radial in particular, with ultraviolet radiation are used.

The active energy ray curing initiator is suitably selected according to the type of monomer (b2) having a carbon-carbon double bond, the type of an active energy ray used (such as a wavelength range), the irradiation intensity, and the like. When using a commonly used active energy ray in an ultraviolet region, possible examples of the initiator are as follows.

Acetophenones

Acetophenone, chloroacetophenone, diethoxyacetophenone, hydroxyacetophenone, α-aminoacetophenone, hydroxypropiophenone, 2-methyl-1-[4-(methylthio)phenyl]-2-morpholinopropan-1-one, and the like Benzoins Benzoin, benzoin methyl ether, benzoin ethyl ether, benzoin isopropyl ether, benzoin isobutyl ether, benzyl dimethyl ketal, and the like Benzophenones Benzophenone, benzoylbenzoic acid, methyl benzoylbenzoate, 4-phenylbenzophenone, hydroxybenzophenone, hydroxy-propylbenzophenone, acrylated benzophenone, Michler's ketone, and the like Thioxanthones Thioxanthone, chlorothioxanthone, methylthioxanthone, diethylthioxanthone, dimethylthioxanthone, and the like Others Benzyl, α-acyloxime ester, acylphosphine oxide, glyoxy ester, 3-ketocoumarin, 2-ethylanthraquinone, camphorquinone, anthraquinone, and the like These active energy ray curing initiators may be used alone, or two or more may be used in combination.

The active energy ray curing initiator is not limited, and the active energy ray curing initiator is contained in an amount of 0.01 to 30% by mass and preferably 0.1 to 20% by mass based on the entirety of the composition obtained by the reaction of compound (a) and compound (b).

[Method for Producing Curable Composition]

Below, a method suitable for producing the curable composition of the present invention will now be described.

The production method of the present embodiment comprises step I of forming a reaction composition containing a compound having a perfluoropolyether group and a curable site (component β). Component β can be produced by mixing a composition containing compound (a) having an isocyanate group (composition (A)) and a composition containing a compound having active hydrogen (composition (B)) and reacting compound (a) and the compound having active hydrogen. Composition α is preferably produced by reacting compound (a) with compound (b1) and compound (b2). Composition α, may be produced by reacting compound (a) with compounds (b1) to (b3).

The method for reacting compound (a) with compounds (b1) to (b3) is not limited. For example, the reaction may be performed in one system (i.e., one-pot synthesis), or separate reactions may be performed in two systems.

In the case of one-pot synthesis, for example, compounds (b1) and (b2) (or compounds (b1) to (b3)) may be simultaneously added to compound (a) to thereby simultaneously react these compounds, or compounds (b1) and (b2) (or compounds (b1) to (b3)) may be sequentially added to sequentially react these compounds. In the case of sequential additions (reactions), the order of additions (reactions) is not limited.

For example, when reacting compound (a) with compounds (b1) to (b3), compounds (b1) to (b3) may be separately added and reacted in any order. Also, among compounds (b1) to (b3), two components may be simultaneously added and reacted, and then the remaining component may be added and reacted. Preferably, compounds (b1) and (b2) may be added and reacted, and then compound (b3) may be added and reacted, or compound (b1) may be added and reacted, then monomer (b2) may be added and reacted, and eventually compound (b3) may be added and reacted. In the case of sequential additions, the component which is last added may be added in an excess.

The solvent usable in this reaction is not limited as long as the reaction proceeds, and various fluorine solvents, various general-purpose solvents, and solvents wherein such solvents are mixed in any proportions are usable. For example, (C) an organic solvent that is free of a radically reactive group is usable. In particular, from the viewpoint of solubility and the like, 1,1-dichloro-1,2,2,3,3-pentafluoropropane (HCFC 225), Zeorora H (manufactured by Zeon Corporation), or (3,3,4,4,5,5,6,6,6-nonafluorohexyl)-2-chloroacrylate is preferably used. The organic solvent that is free of a radically reactive group is as described above.

The catalyst used in step I is as described above.

The production method of the present embodiment may further comprises step II of mixing the reaction composition obtained in step with solvents to form a precipitate containing composition α and separating the formed precipitate.

From the viewpoint of reducing the content of a low molecular weight compound (such as a fluorine-containing oil, a reaction residue possibly produced in step I, or a reaction catalyst), step II is preferably performed. A surface-treating layer formed of such a curable composition is unlikely clouded and unlikely has cissing. Also, such a curable composition has good miscibility with a compound to be mixed with the curable composition, and thus the compounds contained in the curable composition unlikely separate from each other, or the curable composition unlikely separates from the compound mixed with the curable composition.

In step II, the solvent is a solvent in which component β does not substantially dissolve, and is preferably a poor solvent. The use of such a solvent facilitates separation of component β and removal of the organic solvent. Examples of solvents include alcohols such as methanol, ethanol, iso-propanol, n-butanol, isobutanol, tert-butanol, sec-butanol, 3-pentanol, octyl alcohol, 3-methyl-3-methoxybutanol, and tert-amyl alcohol; aliphatic hydrocarbons such as hexane, cyclohexane, heptane, octane, nonane, decane, undecane, dodecane, and mineral spirits; aromatic hydrocarbons such as benzene, toluene, xylene, naphthalene, and solvent naphtha; and glycol ethers such as ethyl cellosolve, methyl cellosolve, methyl cellosolve acetate, ethyl cellosolve acetate, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether, and ethylene glycol monoalkyl ether. From the viewpoint of not dissolving component β and enabling the contained reaction solvent and impurities such as a tin catalyst to be removed, a protic polar solvent is preferably used as the solvents. Among the above solvents, alcohols are preferably used from the viewpoint of being easily handled at room temperature and capable of being easily separated from the precipitate. The above solvents can be used alone or in combination.

From the viewpoint of more favorably reducing the content of a low molecular weight compound, a solvent in which component β does not substantially dissolve and a polar solvent are preferably used as the solvents. That is, it is preferable that the method for producing a curable composition includes mixing a reaction composition containing a compound having a perfluoropolyether group and a curable site with solvents to form a precipitate containing component β, separating the formed precipitate, and preparing a solution containing the separated precipitate, wherein a solvent in which the compound having a perfluoropolyether group and a curable site does not substantially dissolve and a polar solvent are preferably used as the solvents.

The use of a solvent in which component β does not substantially dissolve and a polar solvent makes it possible to reduce the content of a low molecular weight compound (such as a fluorinated oil, a reaction catalyst, or a hydrocarbon monomer) and the content of a high molecular weight compound (such as a hydrocarbon-based high molecular weight compound). When a curable composition obtained through such steps is used, the formed surface-treating layer is unlikely clouded or unlikely has cissing.

The polar solvent is preferably an aprotic polar solvent, and examples include ketones such as acetone, methyl ethyl ketone, and methyl isobutyl ketone; and ethers such as diisopropyl ether and propylene glycol methyl ether. The solvent in which component β does not substantially dissolve and the polar solvent may be used as a mixture, or the aforementioned solvent may be used and then the polar solvent may be used. From the viewpoint of operating efficiency, the solvents are preferably used as a mixture.

More specifically, when using an alcohol (such as methanol) as the solvent in which component β does not substantially dissolve and a ketone (such as acetone) as the polar solvent, the alcohol and the ketone can be used in a mass ratio range of alcohol:ketone=100:1 to 1:1.

The method for separating the precipitate is not limited, and can be carried out, for example, by filtration or removing the upper phase.

The separated precipitate obtained in step II above may be used in the preparation of a precipitate-containing solution.

The precipitate-containing solution may be a solution containing at least one selected from the group consisting of a curable resin, a curable monomer, and a solvent usable in step I (such as HCFC 225, Zeorora H, or (3,3,4,4,5,5,6,6, 6-nonafluorohexyl)-2-chloroacrylate) and the precipitate.

The solution is preferably a solution containing a curable resin and/or a curable monomer and the precipitate. The precipitate containing component β is preferably dissolved in a curable resin and/or a curable monomer.

In one embodiment, in the method for producing a curable composition, the reaction composition formed in step I contains (C) an organic solvent, that is free of a radically reactive group. In the present embodiment, the method for producing a curable composition comprises step I of forming a reaction composition containing a compound having a perfluoropolyether group and a curable site (component β) and (C) an organic solvent that is free of a radically reactive group, and step II' of removing the organic solvent from a mixture containing the reaction composition obtained in step I and a curable resin and/or a curable monomer.

In step II', as a method for removing the organic solvent from the reaction composition, a known method for removing an organic solvent from a composition is usable. For example, the organic solvent can be removed by heating. Conventionally, the organic solvent is removed merely by heating the reaction composition, but in this case, polymerization of component β may proceed due to the heat, resulting in gelation. On the other hand, in the method of the present embodiment in which the reaction composition is mixed with a curable resin and/or a curable monomer and then the mixture is heated, such gelation unlikely occurs.

In the above embodiment, the boiling point of the curable resin and/or the curable monomer is preferably higher than the boiling point of the organic solvent.

The heating of the mixture can be carried out at a temperature at which the organic solvent can volatilize. When mixing the reaction composition with the curable monomer, the heating is preferably carried out at a temperature at which the curable monomer unlikely polymerizes. The mixture is preferably heated under reduced pressure as necessary.

In one embodiment, the curable composition produced in step II' may be further mixed with another curable resin and/or curable monomer. Such another curable resin and/or curable monomer may be a curable resin and/or a curable monomer having any boiling point.

In one embodiment, composition (A) contains a compound having an isocyanurate-type polyisocyanate structure as a main component, and composition (B) is as defined above.

In the present embodiment, the method for producing a curable composition comprises step I and step II described above. In step II, the above-described solvent in which component β does not substantially dissolve and the above-described polar solvent are used.

The present embodiment is preferable especially from the viewpoint of reducing the content of a compound on the low molecular weight side.

In one embodiment, composition (A) contains isocyanurate-type polyisocyanate (a1) as a main component. Composition (B) is as defined above, and more preferably composition (B) is substantially free of a compound represented by formula (b1-ii). The phrase "substantially free of a compound represented by formula (b1-ii)" is as defined above. In the present embodiment, compound (b2) and compound (b3) are as defined above.

In the present embodiment, isocyanurate-type polyisocyanate (a1) is used, which is preferable from the viewpoint of especially suppressing the content of a high molecular weight component contained in the curable composition.

In the present embodiment, the method for producing a curable composition preferably comprises step I and step II described above. That is, it is preferable that in the present embodiment, the method for producing a curable composition comprises reacting a composition (A) comprising compound having an isocyanate group (compound (a)) and a composition (B) comprising a compound having active hydrogen to form a reaction composition comprising a compound having a perfluoropolyether group and a curable site, wherein composition (A) comprising a compound having an isocyanate group comprises an isocyanurate-type polyisocyanate as a main component and the content of a triisocyanate obtained by trimerizing a diisocyanate is in an amount of 60% by mass or more based on the total of composition (A).

In one embodiment, composition (A) contains an isocyanurate-type polyisocyanate as a main component. In the present embodiment, compound (b1) is substantially free of a compound represented by formula (b1-ii). The phrase "substantially free of a compound represented by formula (b1-ii)" is as defined above. In the present embodiment, compound (b2) and compound (b3) are as defined above. The present embodiment is preferable from the viewpoint of suppressing the content of a high molecular weight component contained in the curable composition.

In the present embodiment, the method for producing a curable composition preferably comprises step I and step II described above.

[Article]

The article of the present invention comprises a base material and a layer formed of the curable composition of the present invention (i.e., a surface-treating layer) on the surface of the base material (hereinafter, the composition and the curable composition of the present invention are also collectively referred to as a "surface-treating agent"). The curable composition of the present invention may be used as-is, or may be used in combination with another curable material. For example, the surface-treating agent of the present invention may be added to a black matrix resist for a color filter or to an organic EL dye barrier resist to form a surface-treating layer on a base material such as a glass base material, and thereby liquid repellency can be imparted to the surface of such a base material.

The curable material preferably contains a compound having at least one carbon-carbon double bond or a resin that can be cured by being heated (such as an epoxy resin, a silicone resin, or a polyimide resin), and is more preferably a compound having at least one carbon-carbon double bond. For example, the curable material means, but is not limited to, a composition containing a compound that is monofunctional and/or polyfunctional acrylate and methacrylate (hereafter, acrylate and methacrylate are also collectively referred to as "(meth)acrylate"), monofunctional and/or polyfunctional urethane (meth)acrylate, or monofunctional and/or polyfunctional epoxy (meth)acrylate. The curable material is, but is not limited to, a composition generally regarded as a hard coating agent or an anti-reflective agent, such as a hard coating agent containing polyfunctional (meth)acrylate and an antireflective agent containing fluorine-containing (meth)acrylate. The hard coating agent is commercially available as, for example, Beamset 502H, 504H, 505A-6, 550B, 575CB, 577, and 1402 (trade names) from Arakawa Chemical Industries Ltd., EBECRYL 40 (trade name) from Daicel Cytec Co., Ltd., and HR300 series (trade name) from Yokohama Rubber Co., Ltd. The anti-reflective agent is commercially available as, for example, Optool AR-110 (trade name) from Daikin Industries, Ltd.

The curable material may be a silicon-containing compound capable of forming a polysiloxane structure by a reaction, preferably by a sol-gel reaction.

In one embodiment, the silicon-containing compound may be an organosilicon compound containing carbon and silicon.

Examples of the organosilicon compound include Si—H compounds having a Si—H bond; Si—N compounds having a Si—N bond such as an aminosilane compound, silazane, silylacetamide, and silylimidazole; Si—O compounds having a Si—O bond such as monoalkoxysilane, dialkoxysilane, trialkoxysilane, tetraalkoxysilane, siloxane, a silyl ester, and silanol; halogenosilanes such as Si—Cl compounds having a Si—Cl bond such as monochlorosilane, dichlorosilane, trichlorosilane, and tetrachlorosilane, Si—(C)$_4$ compounds, Si—Si compounds having a Si—Si bond, vinylsilane, allylsilane, and ethynylsilane. That is, the organosilicon compound is preferably at least one compound selected from the group consisting of a Si—H compound, a Si—N compound, a halogenosilane, a Si—(C)$_4$ compound, a Si—Si compound, vinylsilane, allylsilane, and ethynylsilane. The organosilicon compound is more preferably a compound in which at least one atom selected from the group consisting of hydrogen, oxygen, and halogen is bonded to Si.

Specific examples of the organosilicon compound are as shown below.

[Si—H Compounds]

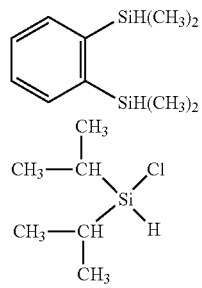
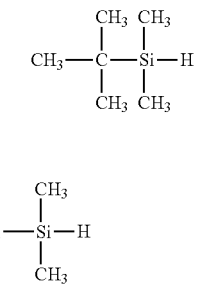
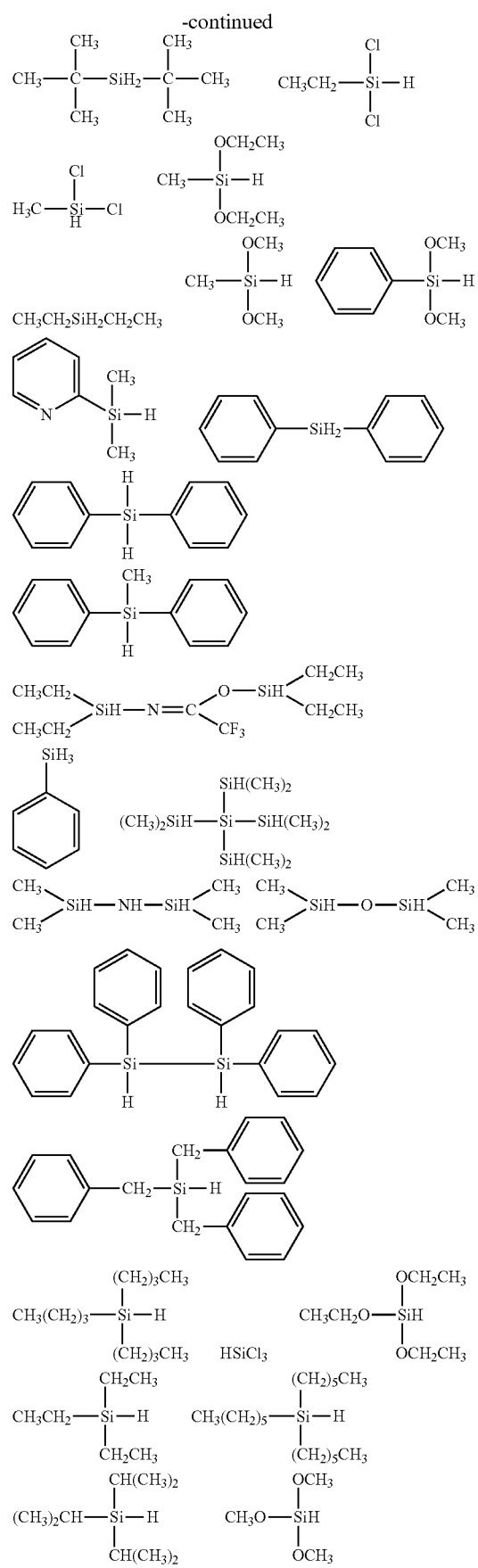

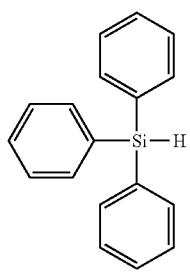
[Si—N Compounds]
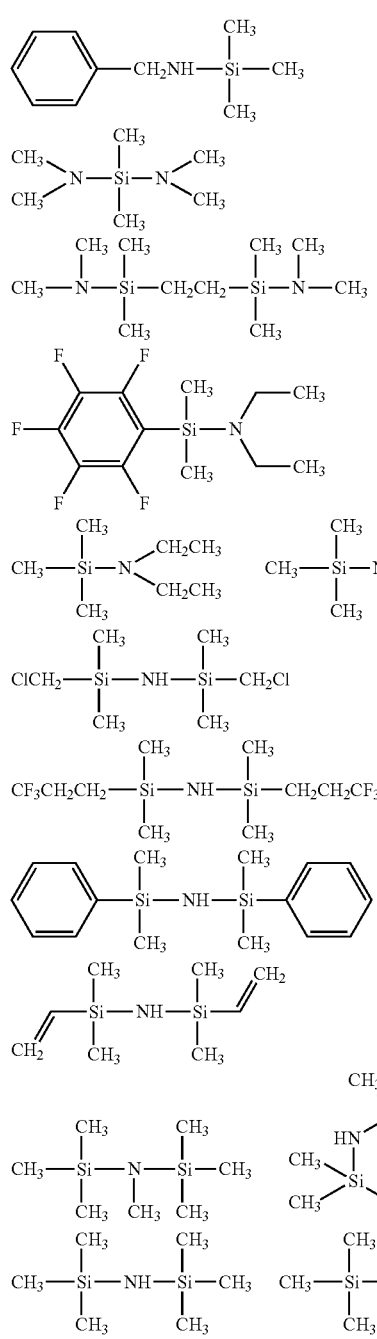
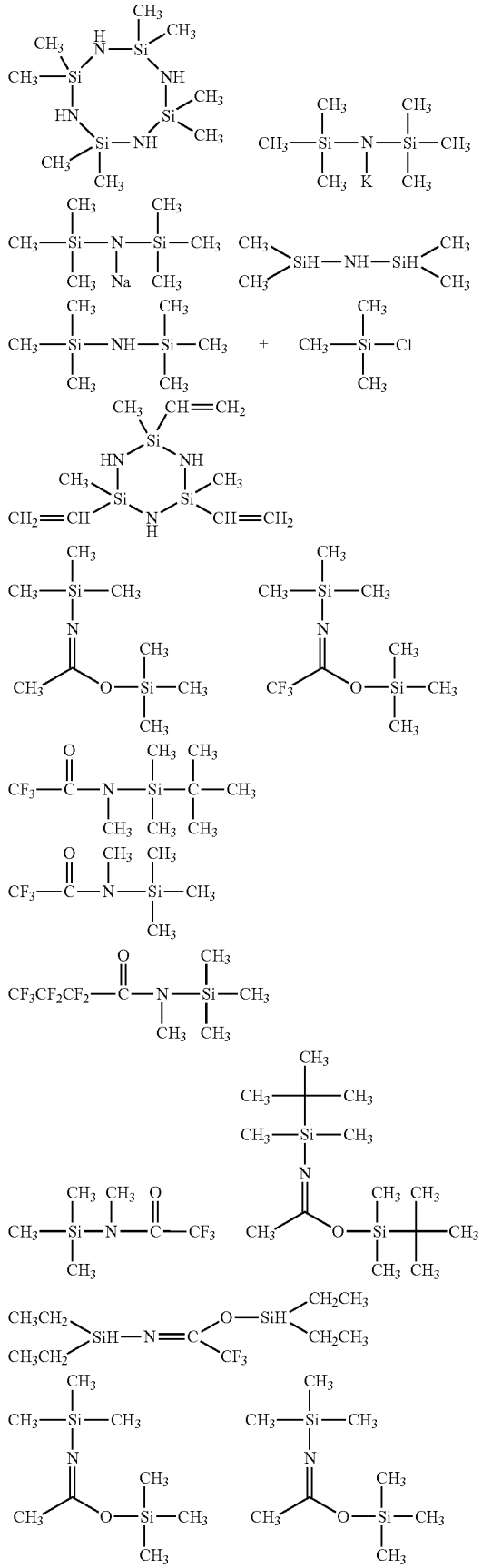

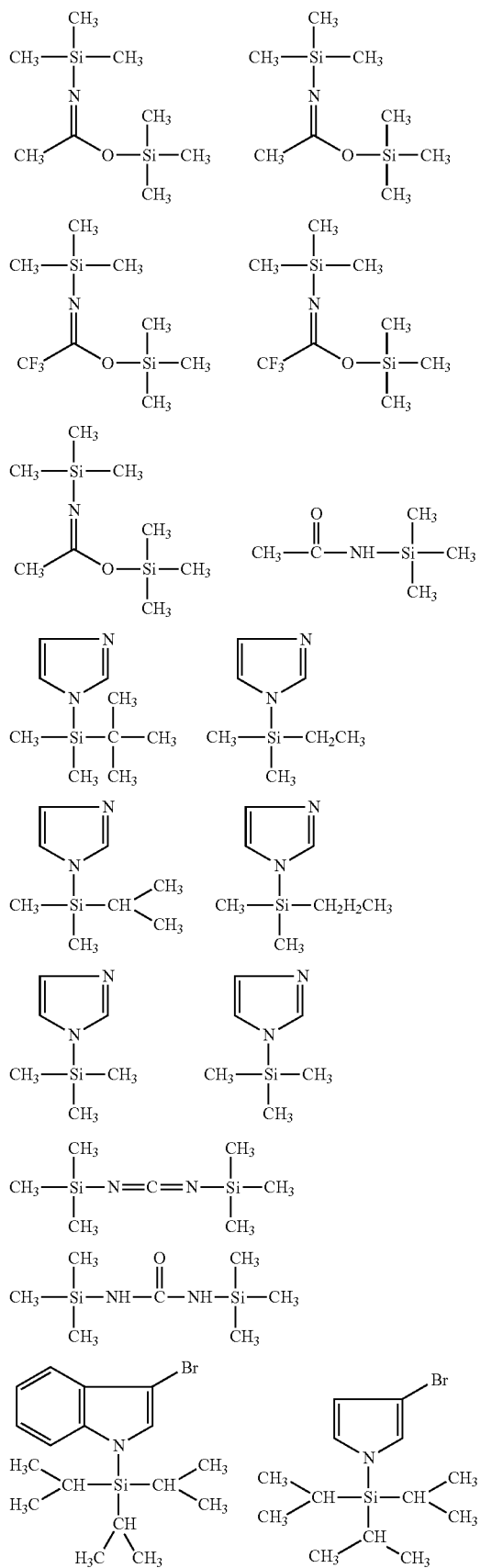
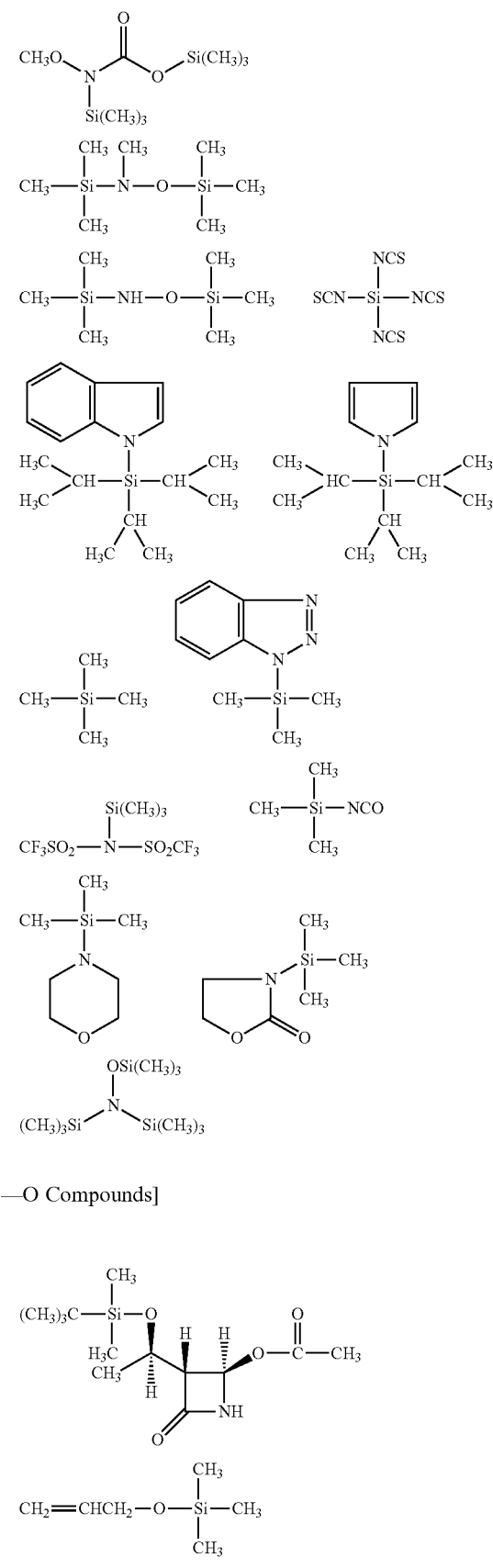
[Si—O Compounds]

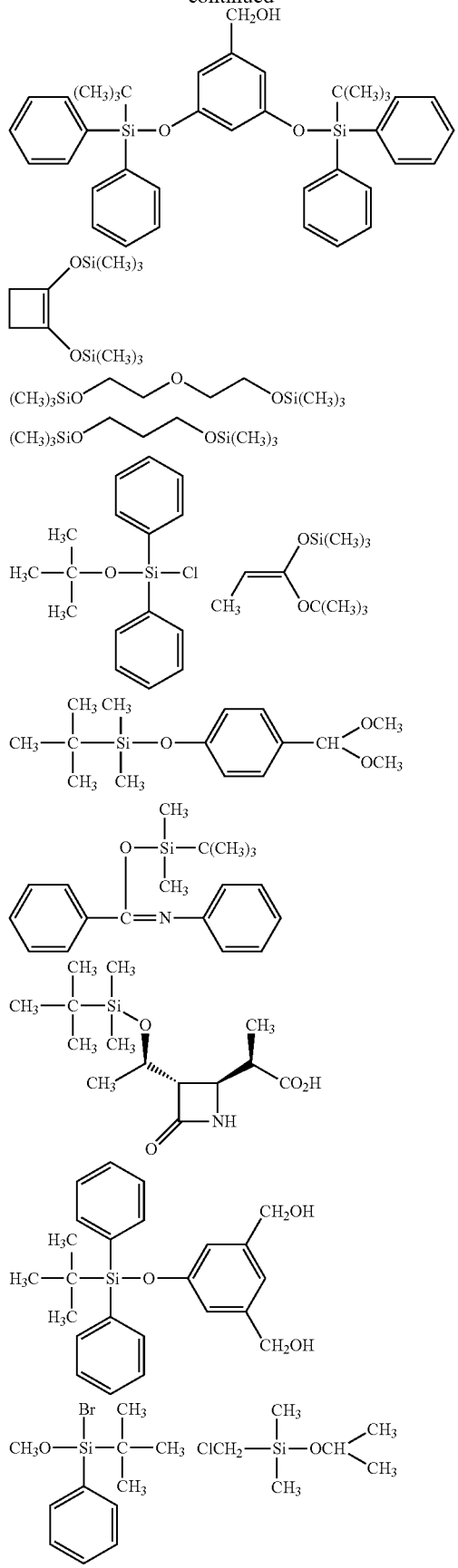
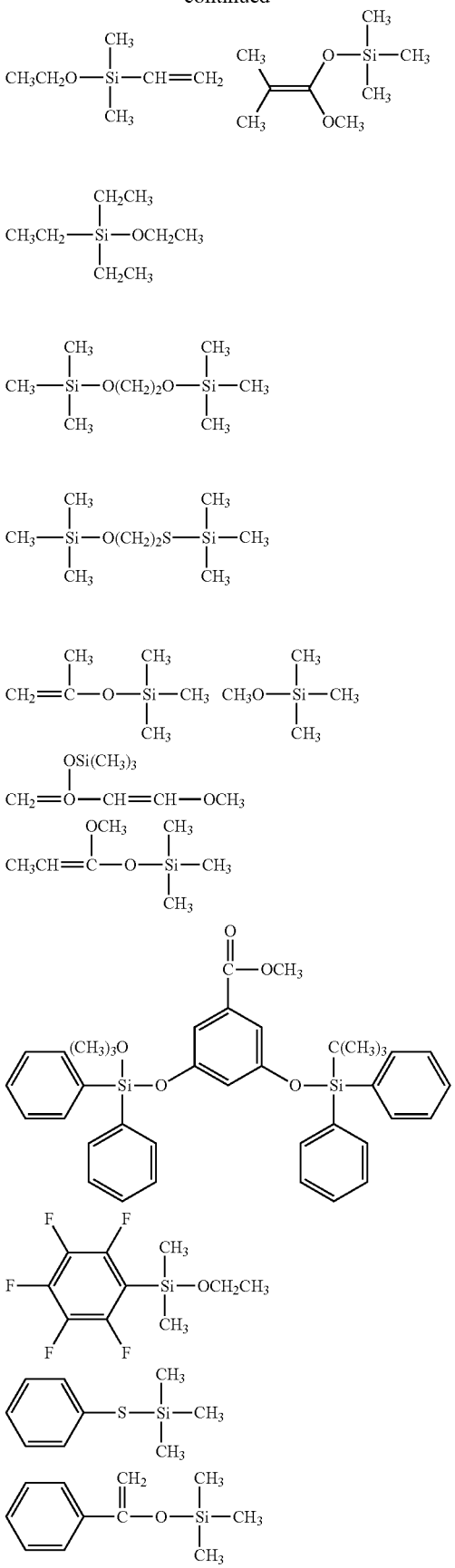

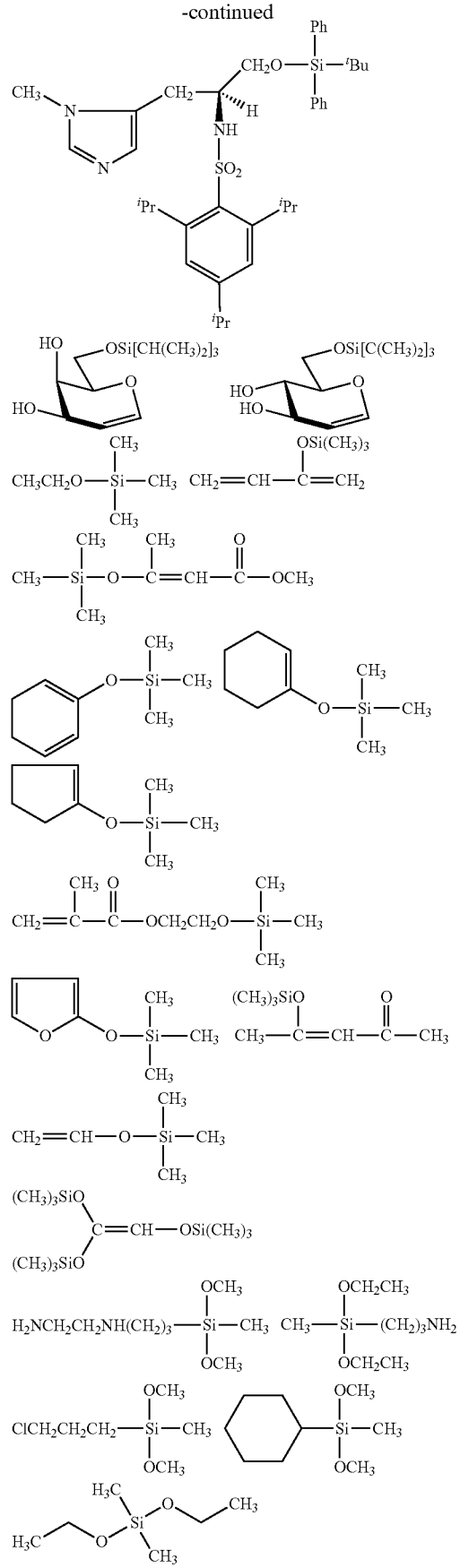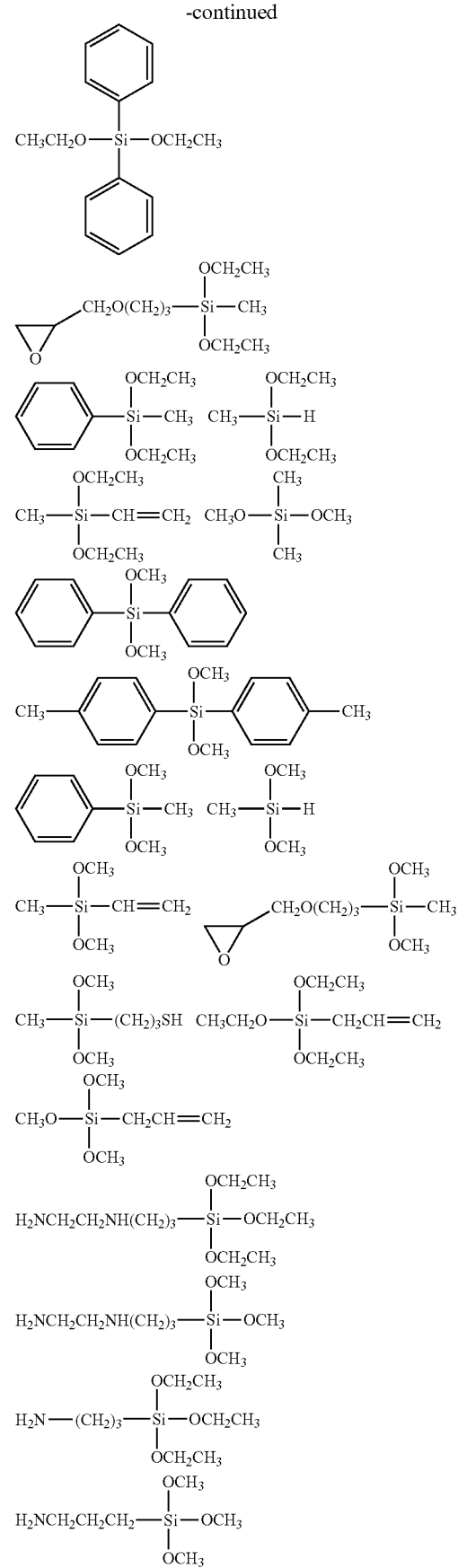

-continued
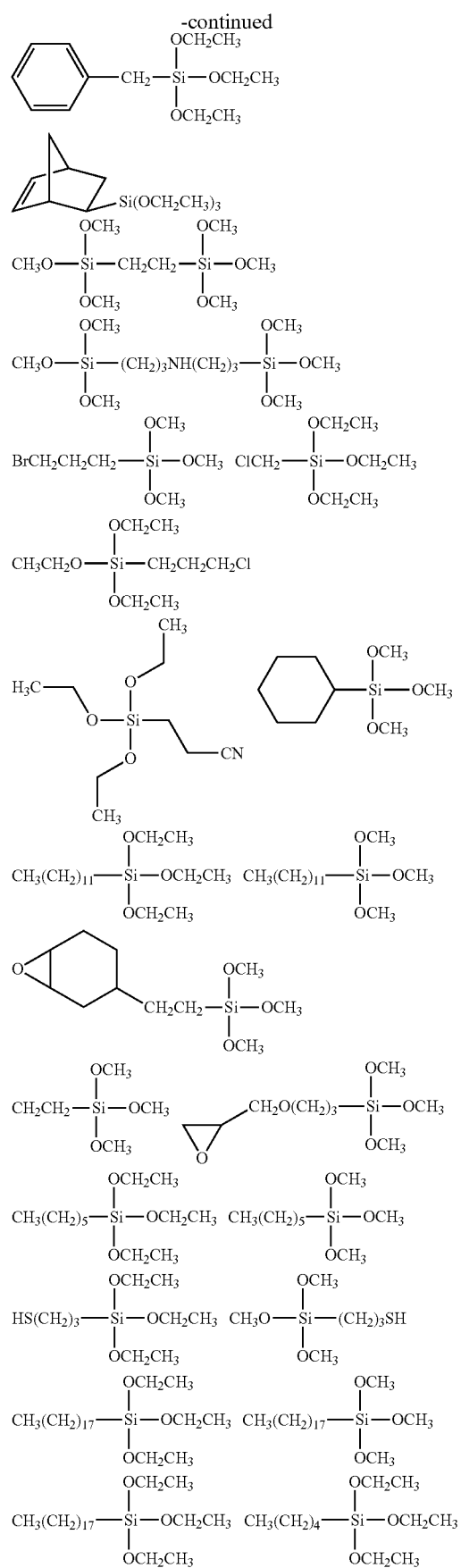
-continued
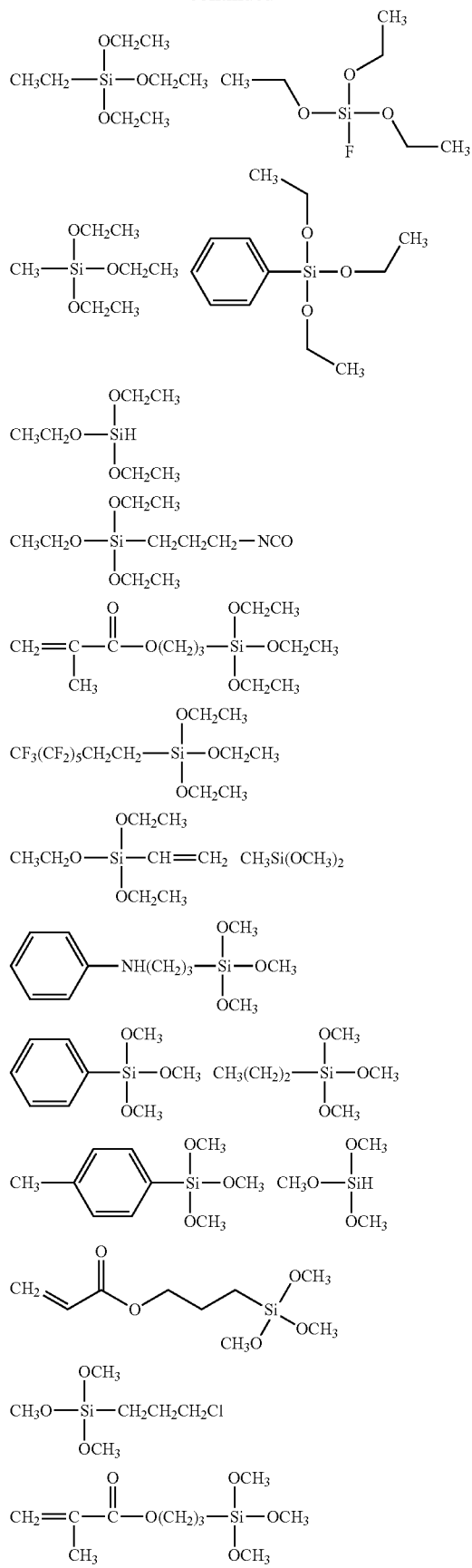

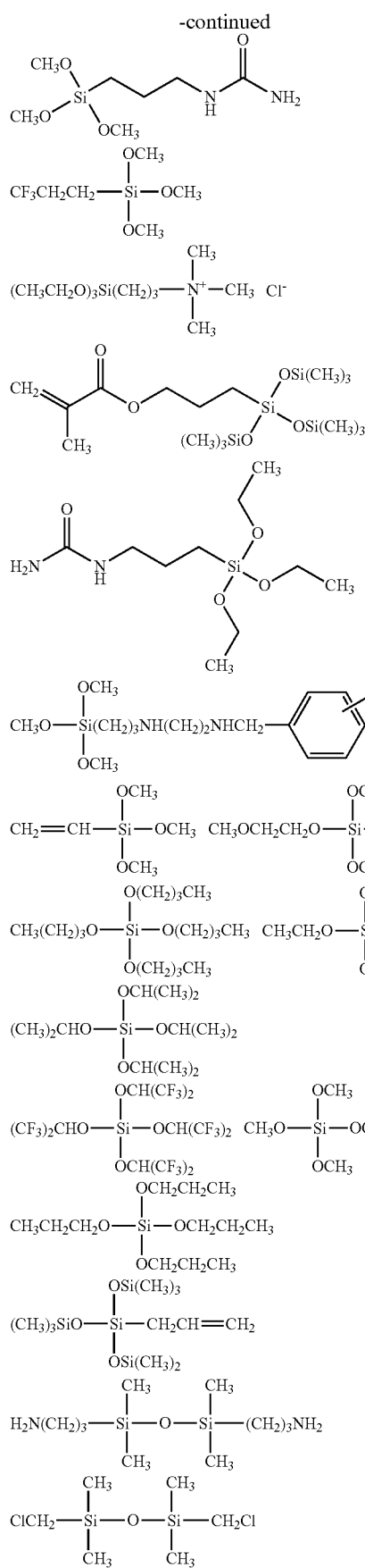
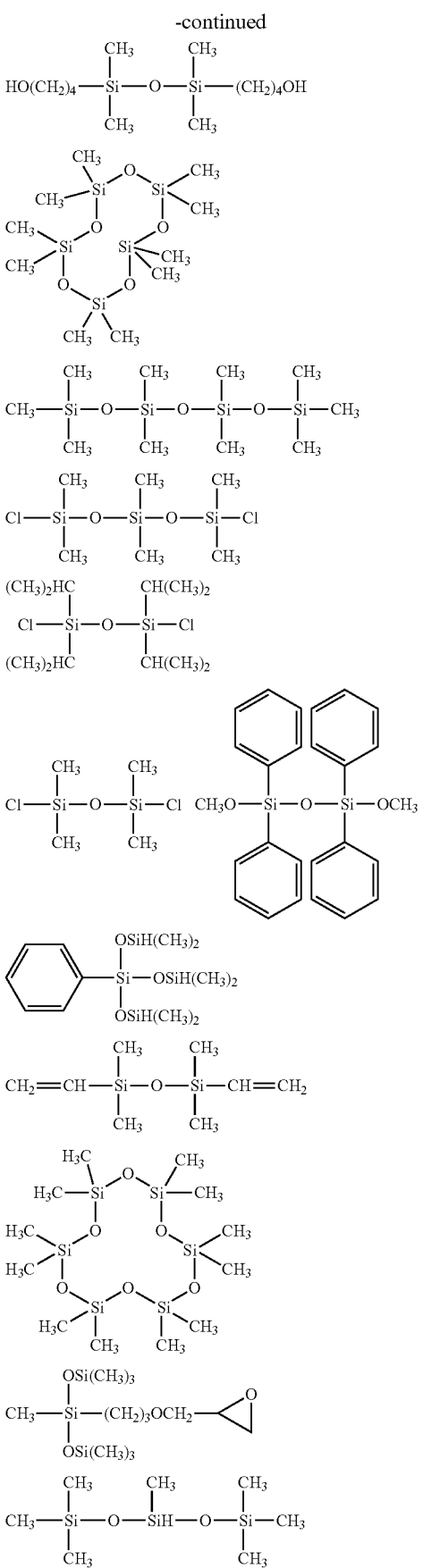

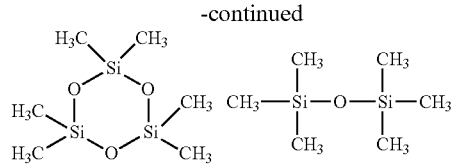
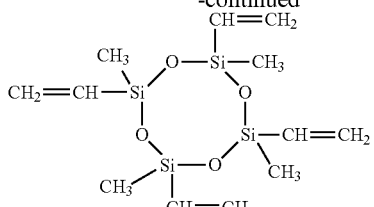
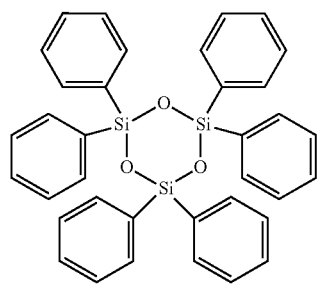
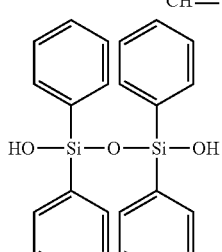
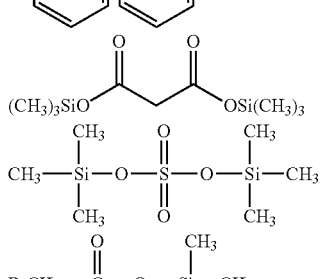
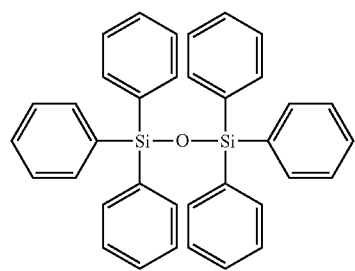
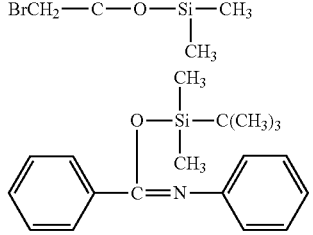
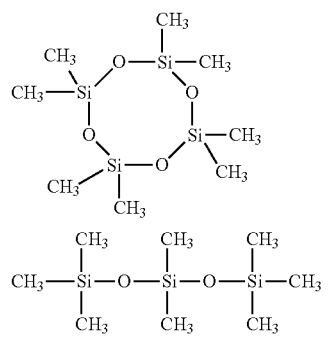
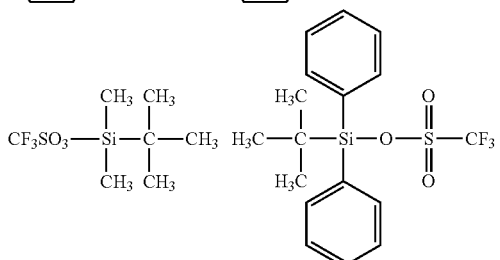
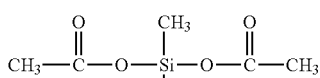
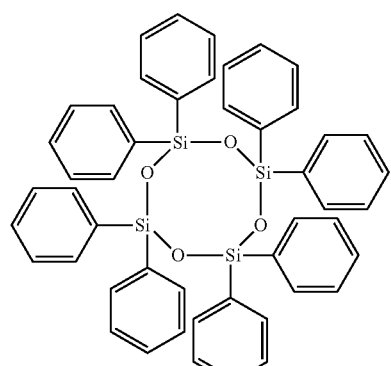
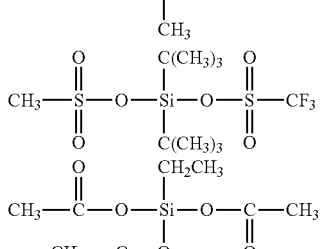
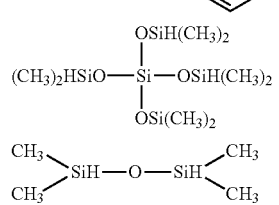
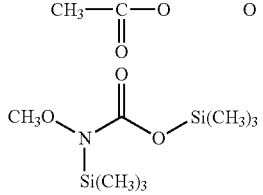

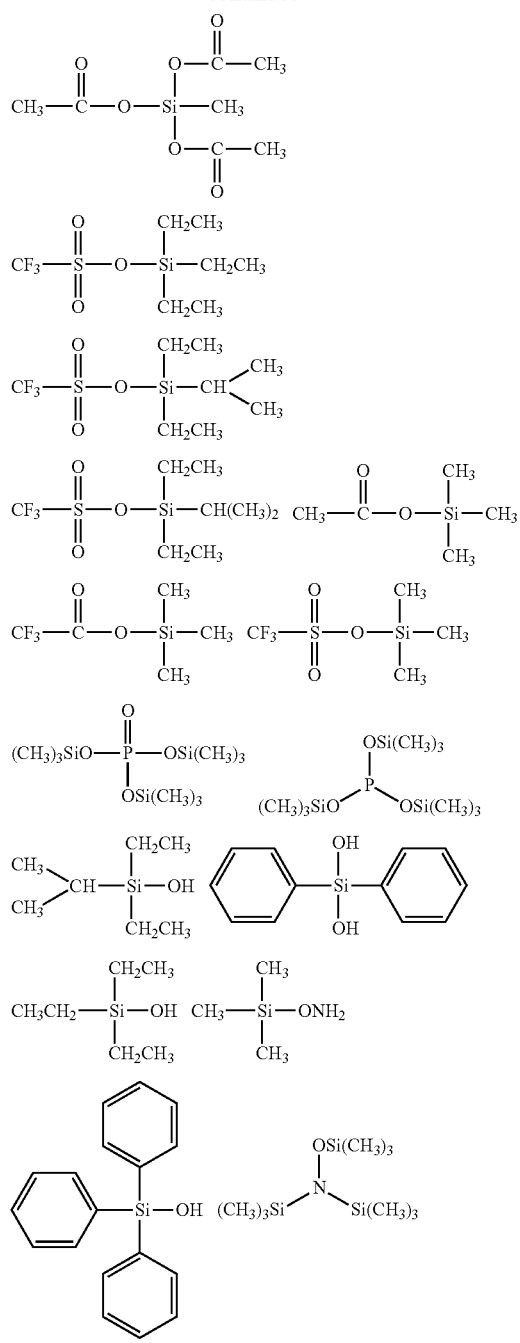
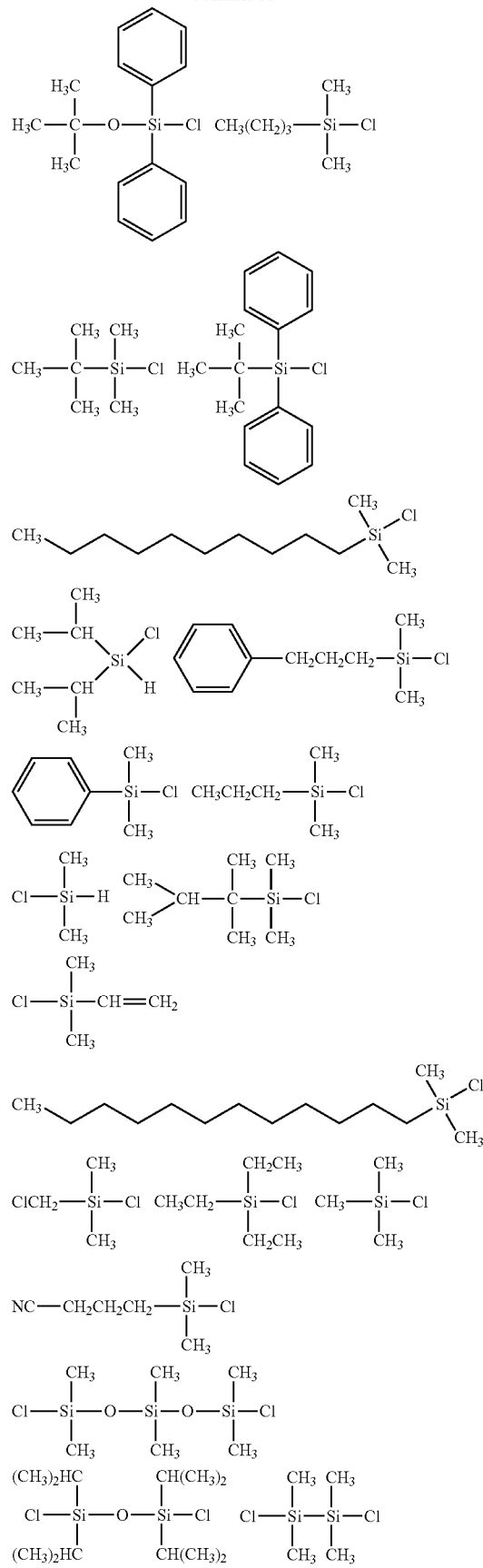
[Halogenosilanes]
Si—Cl Compounds:

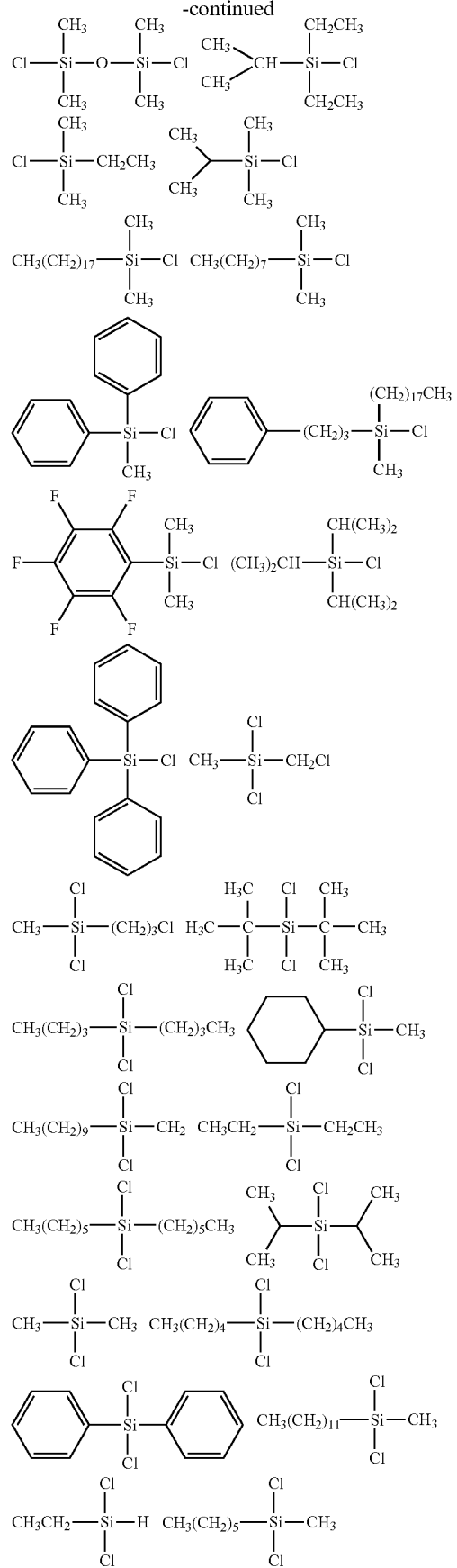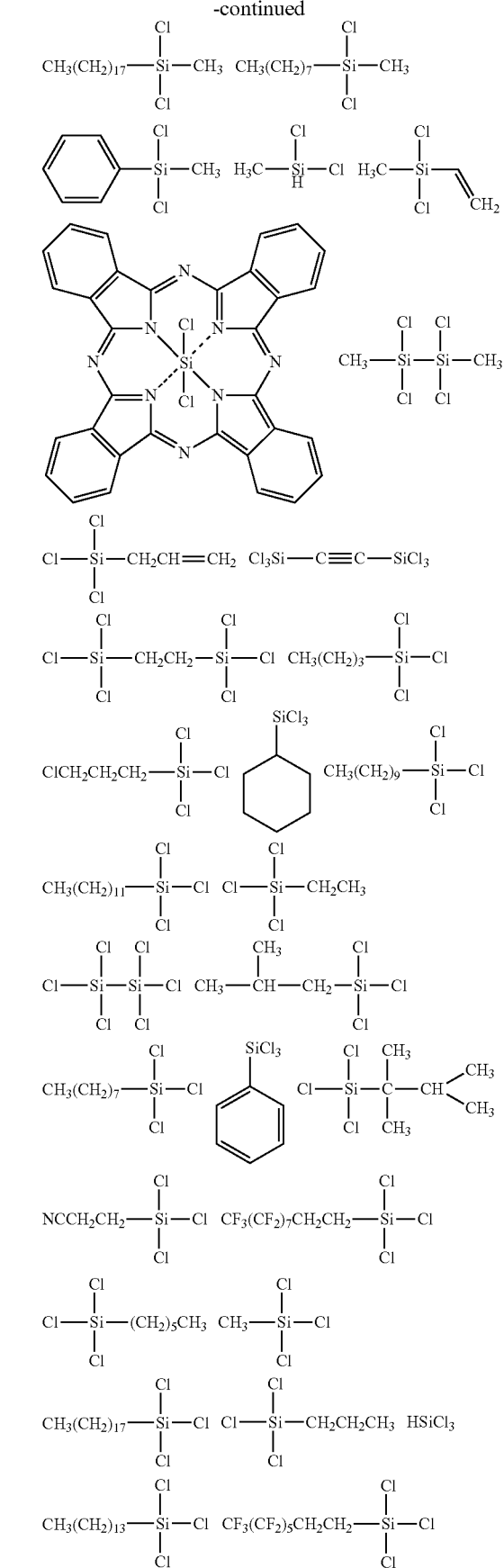

-continued
CH₂=CH—SiCl₃  SiCl₄
Halogenosilanes Other than Si—Cl Compounds:
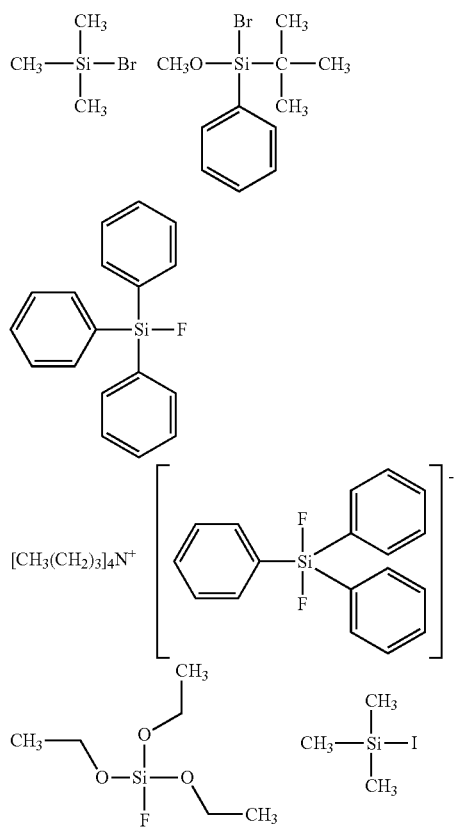
[Si—(C)₄ Compounds]
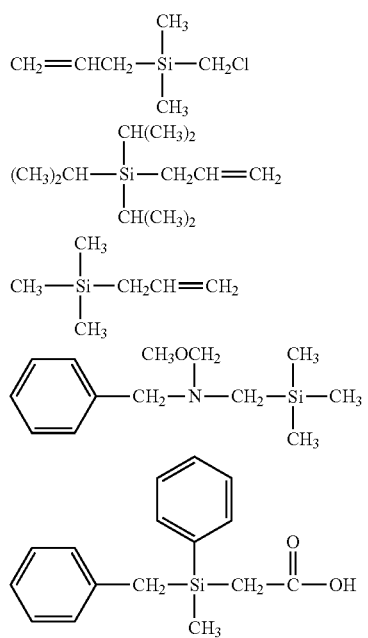
-continued
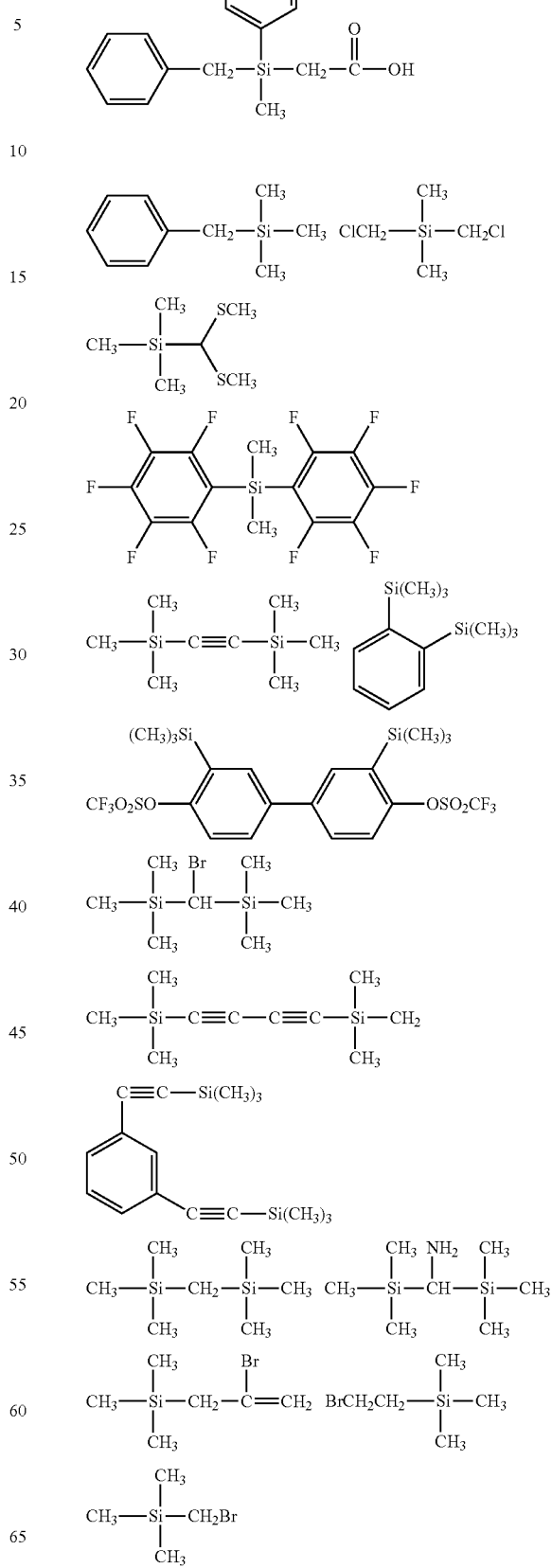

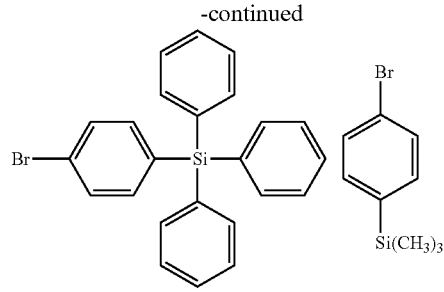
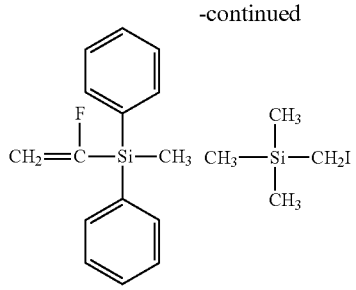
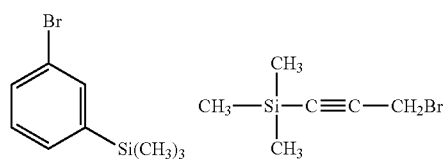
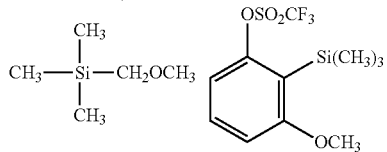
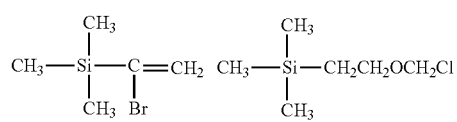
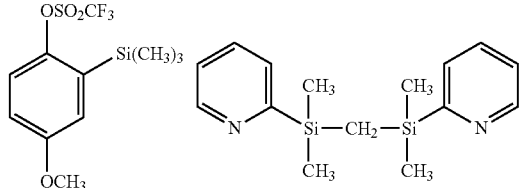
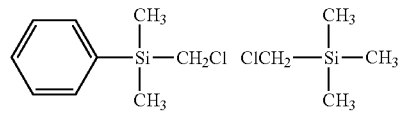
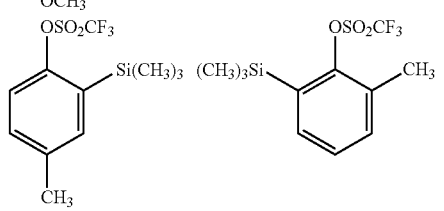
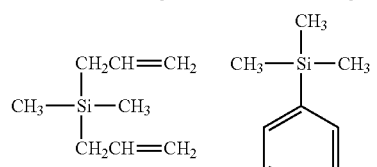
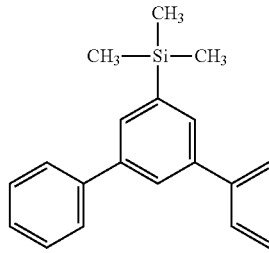
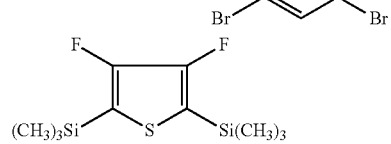
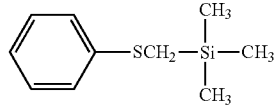
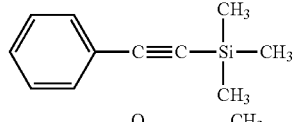
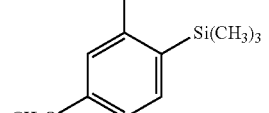
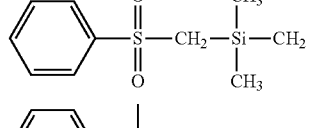
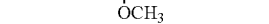
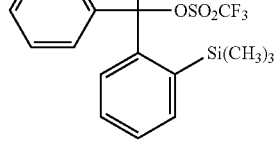
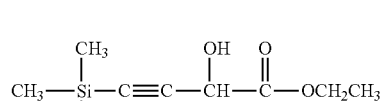
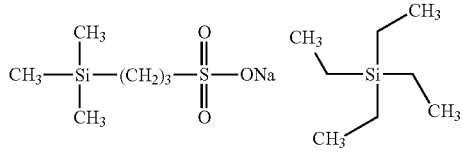
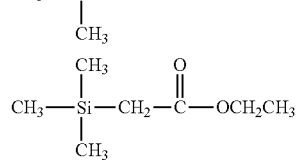

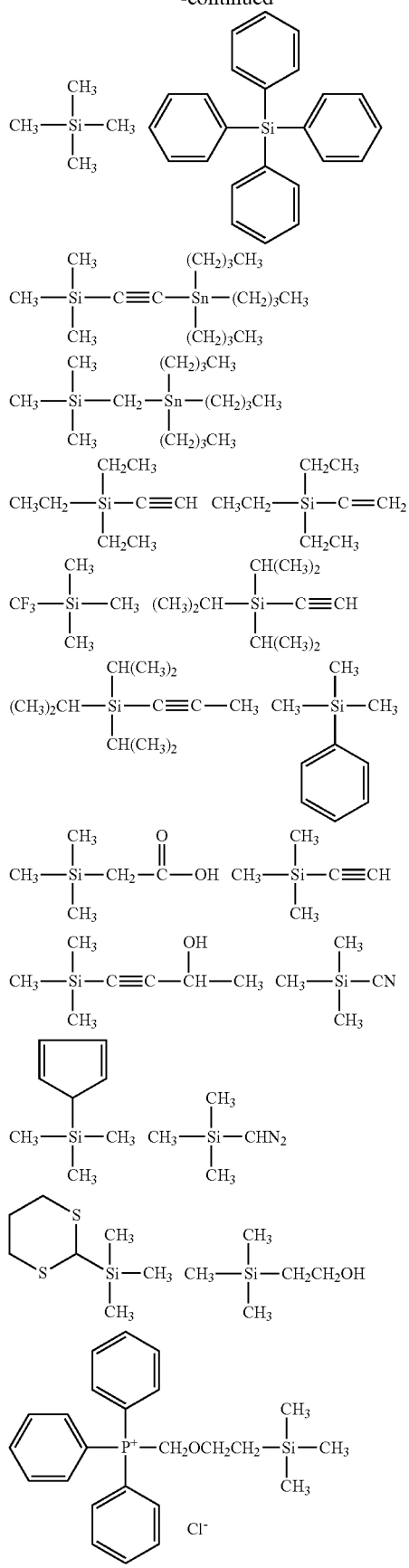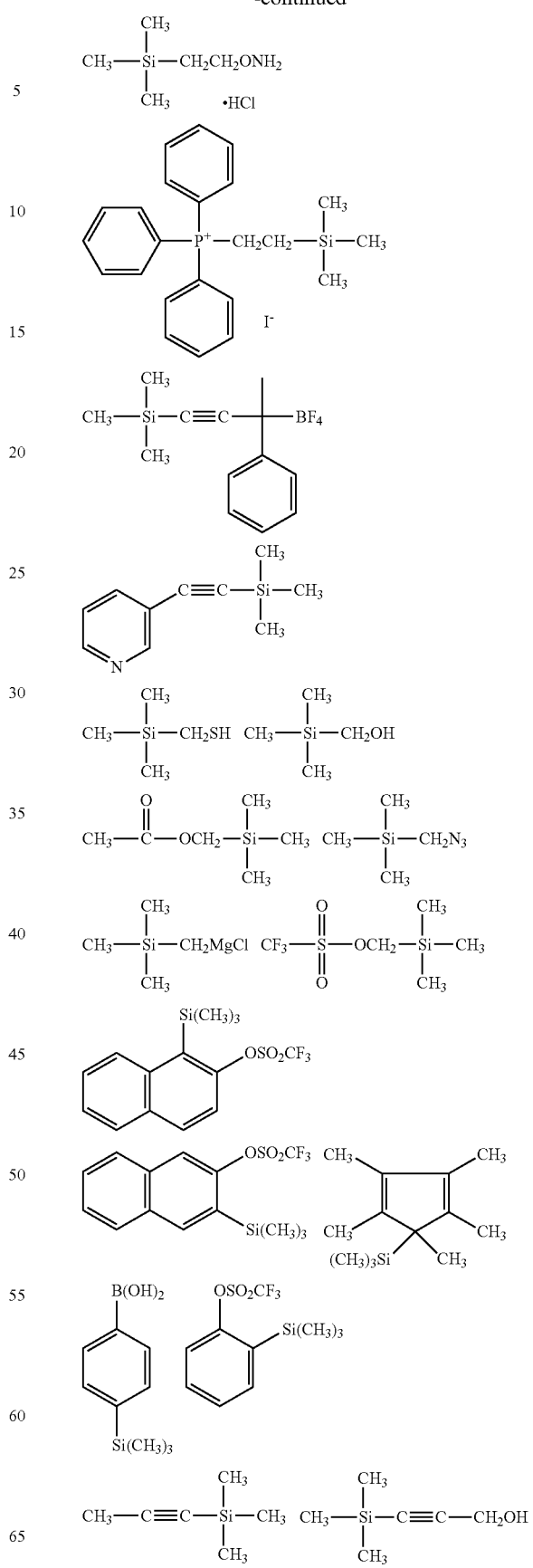

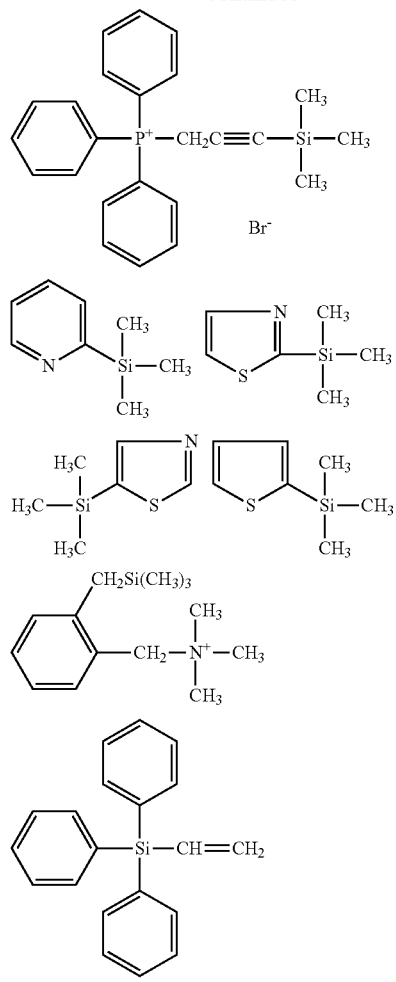
[Si—Si Compounds]
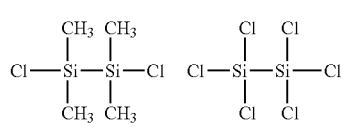
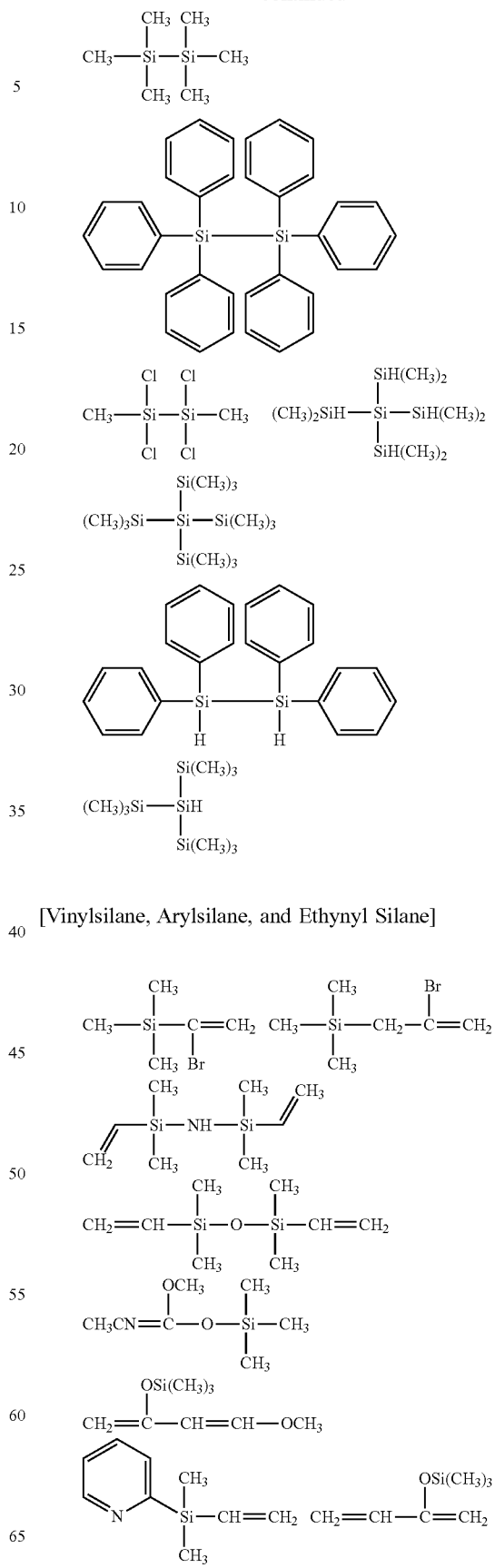
[Vinylsilane, Arylsilane, and Ethynyl Silane]

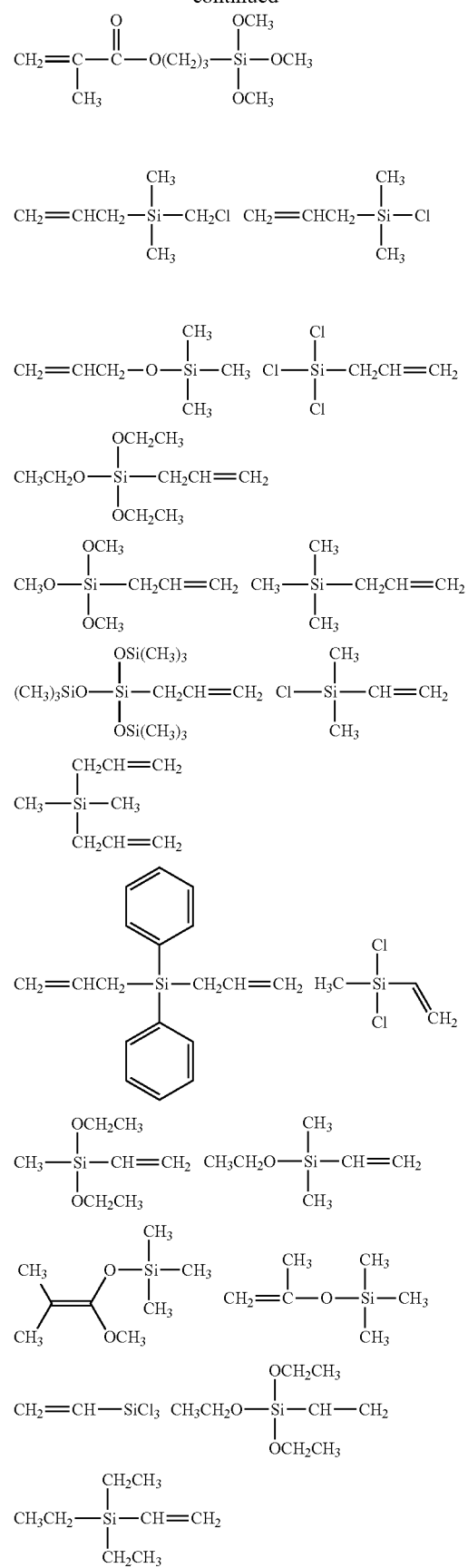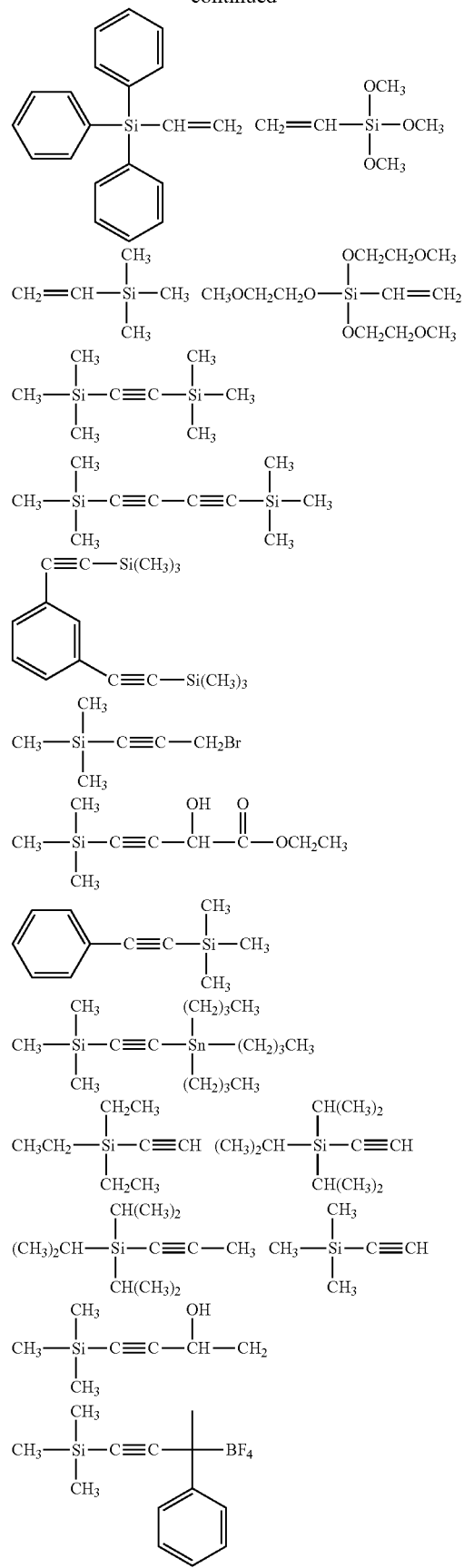

-continued

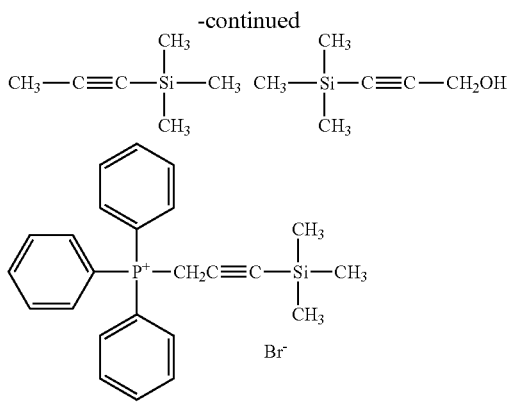

The organosilicon compound is more preferably a compound represented by formula (2) below:

$$(Si(R^a)_s(R^b)_t(R^c)_u(R^d)_v(R^e)_w)_x \quad (2)$$

[wherein $R^a$, $R^b$, $R^c$, and $R^d$ are each independently a hydrogen atom, a halogen atom, an alkoxyl group having 1 to 10 carbon atoms, an amino group having 1 to 10 carbon atoms, an alkyl group having 1 to 10 carbon atoms, an aryl group having 6 to 10 carbon atoms, an allyl group having 3 to 10 carbon atoms, or a glycidyl group having 3 to 10 carbon atoms; $R^e$ is each independently —O—, —NH—, —C≡C—, or a silane bond; s, t, u, and v are each independently 0 or 1; w is an integer of 0 to 4; x is 1 to 20; when x is 1, s+t+u+v is 4, and w is 0; when x is 2 to 20, s+t+u+v is each independently 0 to 4, and w is each independently 0 to 4, and when w is an integer of 1 or more, at least two Si atoms are bonded in a linear, ladder, cyclic, or polycyclic manner via $R^e$]. $R^a$, $R^b$, $R^c$, and $R^d$ are monovalent groups bonded to Si. $R^e$ is a divalent group bonded to two Si atoms.

It is preferable that in formula (2), at least one of $R^a$, $R^b$, $R^c$, and $R^d$ each independently is a hydrogen atom, a halogen atom, an alkoxy group having 1 to 10 carbon atoms, or an amino group having 1 to 10 carbon atoms, and others are an alkyl group having 1 to 10 carbon atoms, an aryl group having 6 to 10 carbon atoms, an allyl group having 3 to 10 carbon atoms, or a glycidyl group having 3 to 10 carbon atoms. It is preferable that when x is 2 to 20, s+t+u+v each independently is 1 to 3, and w is 1 to 3.

In formula (2), $R^a$, $R^b$, $R^c$, and $R^d$ are preferably each independently an alkyl group having 1 to 6 carbon atoms, an aryl group having 6 to 8 carbon atoms, an alkoxy group having 1 to 6 carbon atoms, or an amino group having 1 to 6 carbon atoms, and more preferably an alkoxy group having 1 to 4 carbon atoms.

In $R^a$, $R^b$, $R^c$, and $R^d$, the number of carbon atoms of the alkyl group is preferably 1 to 5. The alkyl group may be linear, cyclic, or branched. A hydrogen atom may be replaced with a fluorine atom or the like. Examples of the alkyl group include a methyl group, an ethyl group, a propyl group, a butyl group, and a pentyl group. For example, $R^a$, $R^b$, $R^c$, and $R^d$ are each preferably a methyl group, an ethyl group, a propyl group, or an isopropyl group. A methyl group and an ethyl group may be more preferable. The aryl group is preferably, for example, a phenyl group, a naphthyl group, a methylphenyl group, an ethylphenyl group, or a dimethylphenyl group. The halogen atom is preferably fluorine, chlorine, bromine, or iodine, and chlorine is particularly preferable.

In $R^a$, $R^b$, $R^c$, and $R^d$, the number of carbon atoms of the alkoxy group is preferably 1 to 5. The alkoxy group may be linear, cyclic, or branched. A hydrogen atom may be replaced with a fluorine atom or the like. The alkoxy group is preferably a methoxy group, an ethoxy group, a propyloxy group, or a butoxy group, and more preferably a methoxy group or an ethoxy group.

$R^e$ is each independently —O—, —NH—, or a silane bond. $R^e$ is preferably —O—, —NH—, or —C≡C—. $R^e$ is a divalent group bonded to two Si atoms, and due to $R^e$, two or more silicon atoms can be bonded in a linear, ladder, cyclic, or polycyclic manner via $R^e$. When x is an integer of 2 or more, silicon atoms may be bonded to each other. Specific examples of preferable silicon-containing compounds include compounds containing one or two or more Si atoms, such as a Si—H compound, a Si—N compound, a halogenosilane, a Si—(C)$_4$ compound, a Si—Si compound, vinylsilane, allylsilane, and ethynylsilane described above.

In one embodiment, the silicon-containing compound is a compound represented by formula (3) or formula (4)

$$SiR^5_4 \quad (3)$$

$$Si_yO_zR^6_{4y-2z} \quad (4)$$

In formula (3), $R^5$ is each independently represents a halogen atom or a hydrolyzable group.

In formula (4), $R^6$ is each independently represents a halogen atom or a hydrolyzable group. y is 2 or more, z is 1 or more, and 4y–2z is more than 0.

The "hydrolyzable group" as used herein means a group that may be removed from the main backbone of a compound by a hydrolysis reaction. Examples of the hydrolyzable group include —OR, —OCOR, —O—N=CR$_2$, —NR$_2$, —NHR, and halogen (wherein R represents a substituted or unsubstituted alkyl group having 1 to 4 carbon atoms), and —OR (i.e., an alkoxy group) is preferable. Examples of R include unsubstituted alkyl groups such as a methyl group, an ethyl group, a propyl group, an isopropyl group, a n-butyl group, and an isobutyl group; and substituted alkyl groups such as a chloromethyl group.

Examples of the "halogen atom" include a fluorine atom, a chlorine atom, a bromine atom, and an iodine atom. Among these, a fluorine atom, a chlorine atom, and a bromine atom are preferable, a fluorine atom and a chlorine atom are more preferable, and a chlorine atom is further preferable.

The silicon-containing compound may be contained in an amount of, for example 0 to 500 parts by mass, preferably 0 to 400 parts by mass, and more preferably 25 to 400 parts by mass based on total 100 parts by mass of component β contained in composition α of the present invention.

In the surface-treating layer formed of a surface-treating agent containing the silicon-containing compound, component β is segregated on the surface of the surface-treating layer. Accordingly, the silicon-containing compound separates the base material and component β and thus can suppress the adverse effect of substances present in the base material on component β. As a result, the silicon-containing compound contributes to improving the weatherability and the durability of the surface-treating layer. In particular, a silicon-containing compound capable of forming a siloxane bond by a sol-gel reaction can form a denser layer and thus can improve the weatherability and the durability of the surface-treating layer.

The article of the present invention can be produced, for example, as follows.

First, a base material is provided. The base material usable in the present invention may be composed of any suitable material such as glass, a resin (which may be a natural or synthetic resin such as a commonly used plastic material, preferably a polycarbonate resin, a poly(meth)acrylate resin, a polyethylene terephthalate resin, or a triacetyl cellulose resin and may be in a plate, film, or another form), a metal (which may be a simple metal of aluminum, copper, or iron, or a complex such as alloy), a ceramic, a semiconductor (such as silicon or germanium), fiber (such as textile or nonwoven fabric), a fur, a leather, a wood, a porcelain, stone, an architectural member, a medical equipment, or a medical material.

For example, when the article to be produced is an optical member, the material constituting the surface of the base material may be a material for an optical member, such as glass or a transparent plastic. According to its specific configuration and the like, the base material may have an insulating layer, an adhesive layer, a protecting layer, a decorated frame layer (I-CON), an atomizing film layer, a hard coating layer, a polarizing film, a phase difference film, a liquid crystal display module, or the like.

The shape of the base material is not limited. The region of the surface of the base material on which the surface-treating layer should be formed may be at least a part of the surface of the base material, and may be suitably determined according to the application, the specific specification, and the like of the article to be produced.

Next, a film of the surface-treating agent of the present invention is formed on the surface of the base material, the film is subjected to a post-treatment as necessary, and thereby the surface-treating layer is formed from the surface-treating agent of the present invention.

A film of the surface-treating agent of the present invention can be formed by applying the surface-treating agent to the surface of the base material so as to cover the surface. The coating method is not limited. For example, a wet coating method is usable.

Examples of the wet coating method include dip coating, spin coating, flow coating, spray coating, roll coating, gravure coating, microgravure coating, bar coating, die coating, screen printing, and similar methods.

When using the wet coating method, the surface-treating agent of the present invention can be diluted with a solvent and then applied to the surface of the base material. Usable solvents may be fluorine-containing organic solvents and fluorine-free organic solvents described above. From the viewpoint of the stability of the surface-treating agent of the present invention and solvent volatility, the following solvents are preferably used: perfluoro aliphatic hydrocarbons having 5 to 12 carbon atoms (such as perfluorohexane, perfluoromethylcyclohexane, and perfluoro-1,3-dimethylcyclohexane); polyfluoroaromatic hydrocarbons (such as bis(trifluoromethyl)benzene); polyfluoroaliphatic hydrocarbons; hydrofluoroethers (HFEs) (such as alkyl perfluoroalkyl ethers (wherein the perfluoroalkyl group and the alkyl group may be linear or branched) such as perfluoropropyl methyl ether ($C_3F_7OCH_3$), perfluorobutyl methyl ether ($C_4F_9OCH_3$), perfluorobutyl ethyl ether ($C_4F_9OC_2H_5$), and perfluorohexyl methyl ether ($C_2F_5CF(OCH_3)C_3F_7$)), hydrochlorofluorocarbons (such as Asahiclin AK-225 (trade name)), cellosolve solvents such as methyl cellosolve, ethyl cellosolve, methyl cellosolve acetate, and ethyl cellosolve acetate; ester solvents such as diethyl oxalate, ethyl pyruvate, ethyl 2-hydroxybutyrate, ethyl acetoacetate, ethyl acetate, butyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate, and ethyl 2-hydroxyisobutyrate; propylene glycol solvents such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, and dipropylene glycol dimethyl ether; ketone solvents such as acetone, methyl ethyl ketone, methyl isobutyl ketone, 2-hexanone, cyclohexanone, methyl amino ketone, and 2-heptanone; alcohol solvents such as methanol, ethanol, propanol, isopropanol, butanol, and diacetone alcohol; and aromatic hydrocarbons such as toluene and xylene. One of these solvents can be used alone, or two or more can be used as a mixture. In particular, hydrofluoroethers, glycol solvents, ester solvents, ketone solvents, and alcohol solvents are preferable; and perfluorobutyl methyl ether ($C_4F_9OCH_3$) and/or perfluorobutylethyl ether ($C_4F_9OC_2H_5$), propylene glycol monomethyl ether, ethyl acetate, butyl acetate, propylene glycol monomethyl ether acetate, methyl ethyl ketone, methyl isobutyl ketone, and diacetone alcohol are particularly preferable.

Then, the film is subjected to a post-treatment. The post-treatment is, but not limited to, carried out by, for example, irradiating active energy rays such as electromagnetic waves in a wavelength range of 380 cm or less, i.e., ultraviolet rays, electron beams, X rays, γ rays, or the like. Carrying out such a post-treatment initiates the curing of the curable site (such as a carbon-carbon double bond) in the composition of the present invention and, if present, the curable site of the hard coating agent, and forms a bond between these compounds, and between these compounds and the base material. Such a post-treatment contributes to improving the frictional durability of the obtained surface-treating layer.

Thus, the surface-treating layer derived from the surface-treating agent of the present invention is formed on the surface of the base material, and the article of the present invention is produced. The surface-treating layer thus obtained has both high surface lubricity (or lubricity such as removability of stains such as fingerprints, and excellent tactile sensations to the fingers) and high frictional durability in addition water-repellency, oil-repellency, and antifouling properties.

The use of the curable composition of the present invention makes it possible to reduce the volatile organic compound (VOC) value of the cured surface-treating layer. For example, the volatile organic compound value after drying the cured surface-treating layer at 65° C. for 12 hours is preferably less than 5% by weight. Evaluations in terms of weight can be made based on the ratio of the difference between the weight before drying and the weight after drying to the weight before drying.

EXAMPLES

Below, the present invention will now be described more specifically by way of Examples. The present invention is not limited to the following Examples.

In the Examples and Comparative Examples, physical properties were measured by the following methods.

(1) Viscosity

In Synthesis Examples 1 to 4, the viscosity value (mPa·s) of a composition at 25° C. was measured using a TV-10 viscometer (manufactured by Toki Sangyo Co., Ltd.). In Synthesis Examples 5 and 6, the viscosity value (mPa·s) of a composition at 25° C. was measured using a vibration viscometer SV-10 (manufactured by A&D Company Limited).

(2) Measurement of Tin Atom Content

The tin atom content in a composition was quantified using an atomic absorption spectrometer (Z8000 manufactured by Hitachi, Ltd.).

(3) Static Contact Angle and Sliding Angle

The static contact angle and the sliding angle were measured by the following method using a fully automated contact angle meter DropMaster 700 (manufactured by Kyowa Interface Science, Inc.).

<Method for Measuring Static Contact Angle and Sliding Angle>

The static contact angle was measured by horizontally placing a base material provided with a cured film, dripping 1 μL of water or 2 μL of n-hexadecane onto the base material from a microsyringe, and capturing a still image 1 second after dripping with a video microscope.

The sliding angle was measured by the following method. A base material provided with a cured film was horizontally placed, 20 μL of water or 20 μL of n-hexadecane was dripped onto the base material from a microsyringe, and a video was recorded with a video microscope from tilting the base material at a rate of 2° per second until the droplet started sliding. The video was played to deterine the angle at which the droplet started sliding as a sliding angle. If the droplet did not slide even when the base material was tilted 90°, it was judged as "did not slide".

(4) Number Average Molecular Weight (Mn), Weight Average Molecular Weight (Mw), and Molecular Weight Distribution (Mw/Mn)

The number average molecular weight (Mn), the weight average molecular weight. (Mw), and the molecular weight distribution (Mw/Mn) of the compositions obtained in Examples and the compositions obtained in Comparative Examples were measured by GPC analysis using an apparatus furnished with the following columns to provide a molecular weight distribution curve. As for the measurement solutions, the compositions obtained in Synthesis Examples 1 to 4 were used, and solutions prepared using HFE 7200 such that composition X accounted for 0.5% by mass was used in Synthesis Examples 5 and 6. Contaminants in the solutions were removed using a 0.2 μm PTFE filter immediately before measurement.

Seven, types of standard poly(methyl methacrylate) having a molecular weight of 1140, 5200, 24830, 55600, 141500, 254100, or 659000 (each having Mw/Mn of 1.20 or less) were used for preparing a calibration curve.

- Column: three KF-806L columns (manufactured by Viscotek) connected in series
- Column temperature: 30° C.
- Measurement apparatus: Gel permeation chromatography (manufactured by Viscotek)
- Detector: Differential refractive index detector. TDA-302 (manufactured by Viscotek)
- Eluent: HCFC 225 (AK-225 manufactured by Asahi Glass Co., Ltd.)/hexafluoro isopropanol (HFIP) [90/10 (w/w)]
- Feeding condition: 0.75 mL/min
- Injection volume of measurement sample: 20 mg/mL (5) NMR Measurement was carried out under the following conditions using an NMR measurement apparatus (manufactured by JEOL Ltd.).

$^{19}$F-NMR measurement condition: 270.05 MHz (trichlorofluoromethane=0 ppm)
Solvent: Hexafluorometaxylene
Cumulative number of scans: 16

Compositions (A-1) and (A-2) used in Synthesis Examples are shown in Table 1.

TABLE 1

|  |  | Composition (A-1) | Composition (A-2) |
|---|---|---|---|
| NCO group content (% by mass) |  | 21.9 | 23.1 |
| Content of isocyanurate condensation product (% by mass) | Dimer | 0 | 6 |
|  | Trimer | 53 | 68 |
|  | Pentamer | 18 | 18 |
|  | Heptamer | 11 | 6 |
|  | Nonamer or higher | 17 | 4 |

Compositions (B-1) to (B-2) and compound (B-3) used in Synthesis Examples are as follows. The composition ratios of composition (B-1) and compound (B-3) are values measured using reverse phase HPLC, and the composition ratio of composition (B-2) is a value measured under the above conditions using $^{19}$F-NMR.

Composition (B-1)
  $CF_3CF_2O$—$PFPE^1$—$CF_2CF_2CH_2OH$: 61% by mass
  $HOCH_2CF_2CF_2O$—$PFPE^1$—$CF_2CF_2CH_2O$: 8% by mass
  $F$—$PFPE^1$—$CF_2CF_2CF_3$: 31% by mass
  In composition (B-1), $PFPE^1$ represents $(CF_2CF_2CF_2O)_n$, and n=12.

Composition (B-2)
  $CF_3CF_2O$—$PFPE^2$-$CF_2CF_2CH_2OH$: 73% by mass
  F-$PFPE^2$-$CF_2CF_2CH_2OH$: 27% by mass
  In composition (B-2), $PFPE^2$ represents $(CF_2CF_2CF_2O)_n$, and n=11.

Compound (B-3)
  $CF_3CF_2O$—$(CF_2CF_2CF_2O)_n$—$CF_2CF_2CH_2OH$ (n=11)

Synthesis Example 1

In a reactor, 14.1 g of composition (A-1) was dissolved in 76 g of Zeorora H (manufactured by Zeon Corporation), and 10 mg of dibutyltin dilaurate was added. This solution was heated to 40 to 45° C. and, while stirring, a solution of 20 g of composition (B-1) dissolved in 20 g of Zeorora H was added dropwise to form composition X. Then, 9.2 g of hydroxyethyl acrylate was added dropwise to the reaction solution, and the mixture was stirred. The point where the absorption of NCO completely disappeared according to the IR method was regarded as the end point of the reaction.

Then, 52 g of propylene glycol monomethyl ether was added to the reaction solution to provide composition 1 having 50 parts by mass of Zeorora H, 30 parts by mass of propylene glycol monomethyl ether, and 20 parts by mass of composition X per 100 parts by mass of composition 1. The viscosity of composition 1 was 10.4 mPa·s, and the tin atom content per 100 parts by mass of composition 1 was 72 ppm.

Synthesis Example 2

The same operation as in Synthesis Example 1 was performed except that 19 g of composition (B-2) was used in place of 20 g of composition (B-1) of Synthesis Example 1 to provide composition 2 having 50 parts by mass of Zeorora H, 30 parts by mass of propylene glycol monomethyl ether, and 20 parts by mass of composition X per 100 parts by mass of composition 2. The viscosity of composition 2 was 5.0 mPa·s, and the tin atom content per 100 parts by mass of composition 2 was 69 ppm.

Synthesis Example 3

The same operation as in Synthesis Example 2 was performed except that 13.8 g of composition (A-2) was used in place of 14.1 g of composition. (A-1) of Synthesis Example 2 to provide composition 3 having 50 parts by mass of Zeorora H, 30 parts by mass of propylene glycol monomethyl ether, and 20% by mass of composition X per 100 parts by mass of composition 3. The viscosity of composition 3 was 5.0 mPa·s, and the tin atom content per 100 parts by mass of composition 3 was 64 ppm.

Synthesis Example 4

The same operation as in Synthesis Example 3 was performed except that 17 g of compound (B-3) was used in place of 19 g of composition (B-2) of Synthesis Example 3 to provide composition 4 having 50 parts by mass of Zeorora H, 30 parts by mass of propylene glycol monomethyl ether, and 20% by mass of composition X per 100 parts by mass of composition 4. The viscosity of composition 4 was 5.4 mPa·s, and the tin atom content per 100 parts by mass of composition 4 was 70 ppm.

Synthesis Example 5

While stirring composition 1 (20 g) obtained in Synthesis Example 1, 50 g of methanol was added. Then, methanol was decanted to provide white solids. After adding 5 g of acetone to the obtained white solids and stirring the mixture, 25 g of methanol was added. White solids were separated again by decantation, 5 g of acetone and 5 g of Zeorora H were added, and the mixture was stirred. Subsequently, 25 g of methanol was added, and white solids (composition X) were separated by decantation. To 5 g of the white solids was added 15 g of (3,3,4,4,5,5,6,6,6-nonafluorohexyl)-2-chloroacrylate to dissolve the white solids, and thus composition 5 having a solid content of 20% by mass was obtained. The viscosity of composition 5 was 17.2 mPa·s, and the tin atom content per 100 parts by mass of composition 5 was 1 ppm or less.

Synthesis Example 6

The same operation as in Synthesis Example 5 was performed except that composition 3 (20 g) obtained in Synthesis Example 3 was used in place of composition 1 to provide composition 6 having a solid content of 20% by mass. The viscosity of composition 6 was 13.2 mPa·s, and the tin atom content per 100 parts by mass of composition 6 was 1 ppm or less.

Comparative Example 1

To 6.0 g of Beamset 575 CE (manufactured by Arakawa Chemical Industries Ltd.) were added 120 mg of Irgacure 7 (manufactured by BASF) as a photoinitiator and composition 1 such that the concentration of composition X was 1 wt % based on the total weight. Then, the mixture was stirred in shade for 10 hours using a rotary mixer to provide a PFPE-containing hard coat material.

Then, 10 μL of the obtained PFPE-containing hard coat material was placed on a glass slide, and a uniform coating was formed using a bar coater. This film was irradiated with a light beam containing 365 nm UV rays at an intensity of 500 mJ/cm$^2$ in a nitrogen atmosphere to form a cured film of the PFPE-containing hard coat material.

Examples 1 to 5

PFPE-containing hard coat materials were obtained in the same manner as in Comparative Example 1 except that compositions 2 to 6 were respectively used in place of composition 1.

Cured films were formed in the same manner as in Comparative Example 1 using the obtained PFPE-containing hard coat materials.

Comparative Example 2

A hard coat material was obtained in the same manner as in Comparative Example 1 except that composition 1 was not added.

A cured film was formed in the same manner as in Comparative Example 1 using the obtained PFPE-containing hard coat material.

Table 2 below shows Mn, Mw, and Mw/Mn obtained using GPC as well as M1 to M3, M2/M1, and M3/M1 obtained from a molecular weight distribution curve. Table 3 below shows the results of measuring the static contact angles and the sliding angles, and the results of evaluating the appearances, of the cured films obtained in Examples and Comparative Examples.

TABLE 2

|  | Obtained composition | Mn | Mw | Mw/Mn | M1 | M2 | M3 | M2/M1 | M3/M1 |
| --- | --- | --- | --- | --- | --- | --- | --- | --- | --- |
| Synthesis Example 1 | Composition 1 | 1681 | 2595 | 1.544 | 1273 | 5145 | 830 | 4.04 | 0.65 |
| Synthesis Example 2 | Composition 2 | 1609 | 2290 | 1.424 | 1278 | 4110 | 849 | 3.21 | 0.66 |
| Synthesis Example 3 | Composition 3 | 1365 | 1660 | 1.216 | 1279 | 2884 | 797 | 2.25 | 0.62 |
| Synthesis Example 4 | Composition 4 | 1307 | 1561 | 1.195 | 1185 | 2625 | 788 | 2.22 | 0.67 |
| Synthesis Example 5 | Composition 5 | 3465 | 5608 | 1.619 | 2939 | 8879 | 1617 | 3.02 | 0.55 |
| Synthesis Example 6 | Composition 6 | 2052 | 2285 | 1.114 | 2035 | 3749 | 1252 | 1.84 | 0.62 |

TABLE 3

|  | Composition used | Static contact angle | | Sliding angle | | |
| --- | --- | --- | --- | --- | --- | --- |
|  |  | Water | n-Hexadecane | Water | n-Hexadecane | Appearance |
| Example 1 | Composition 2 | 105° | 63° | 4° | 3° | A |
| Example 2 | Composition 3 | 106° | 66° | 3° | 4° | A |
| Example 3 | Composition 4 | 109° | 67° | 3° | 3° | A |

TABLE 3-continued

| | Composition used | Static contact angle | | Sliding angle | | Appearance |
|---|---|---|---|---|---|---|
| | | Water | n-Hexadecane | Water | n-Hexadecane | |
| Example 4 | Composition 5 | 108° | 64° | 4° | 4° | A |
| Example 5 | Composition 6 | 108° | 65° | 4° | 3° | A |
| Comparative Example 1 | Composition 1 | 103° | 60° | Did not slide | Did not slide | B |
| Comparative Example 2 | — (Not added) | 51° | 19° | Did not slide | Did not slide | A |

In the appearance column of Table 3, "A" indicates that the cured film is transparent, and "B" indicates that the cured film is whitened.

INDUSTRIAL APPLICABILITY

The present invention can be suitably used to form a surface-treating layer on the surface of a wide variety of base materials.

The present invention includes following embodiments:

Embodiment 1

A composition comprising at least one compound having a perfluoropolyether group and a curable site,
wherein
in a molecular weight distribution curve in gel permeation chromatography measurement, the following formula is satisfied:

$M2/M1 \leq 3.5$ wherein
M1 is a molecular weight at a main peak, and
M2 is a molecular weight at 25% intensity of an intensity of the main peak on a higher molecular weight side than M1.

Embodiment 2

The composition according to Embodiment 1,
wherein
in a molecular weight distribution curve in gel permeation chromatography measurement, the following formula is further satisfied:

$0.45 \leq M3/M1 < 1.0$ wherein
M1 is a molecular weight at a main peak, and
M3 is a molecular weight at 25% intensity of an intensity of the main peak on a lower molecular weight side than M1.

Embodiment 3

The composition according to Embodiment 1 or 2, wherein the compound having a perfluoropolyether group and a curable site comprises a compound having a triisocyanate structure.

Embodiment 4

The composition according to any one of Embodiments 1 to 3, wherein the compound having a perfluoropolyether group and a curable site comprises a compound having an isocyanurate-type polyisocyanate structure.

Embodiment 5

The composition according to any one of Embodiments 1 to 4, wherein the perfluoropolyether group represents:

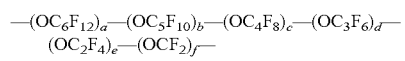

wherein a, b, c, d, e, and f are each independently an integer of 0 or more and 200 or less, a sum of a, b, c, d, e, and f is at least 1, and the occurrence order of respective repeating unit in parentheses with a, b, c, d, e, or f is not limited in the formula.

Embodiment 6

A curable composition comprising the composition according to any one of Embodiments 1 to 5.

Embodiment 7

The curable composition according to Embodiment 6, further comprising at least one selected from the group consisting of a catalyst, a fluorine-containing oil, a curable resin and/or a curable monomer, an organic solvent, an active energy ray curing initiator, a photo-acid-generating agent, a surfactant, a polymerization inhibitor, and a sensitizer.

Embodiment 8

A method for producing a curable composition, wherein the method comprises:
mixing a composition comprising a compound (a) having an isocyanate group and a composition comprising a compound having active hydrogen;
reacting compound (a) with the compound having active hydrogen to form a compound having a perfluoropolyether group and a curable site;
mixing a reaction composition comprising the compound having a perfluoropolyether group and a curable site with solvents to form a precipitate comprising the compound having a perfluoropolyether group and a curable site; and
separating the formed precipitate,
wherein
the solvents comprise a solvent in which the compound having the perfluoropolyether group and the curable site is substantially insoluble and a polar solvent.

Embodiment 9

The method for producing a curable composition according to Embodiment 8, wherein the composition comprising compound (a) comprises an isocyanurate-type polyisocyanate and the content of a triisocyanate obtained by trimerizing a diisocyanate is 40% by mass or more based on the total mass of the composition comprising compound (a).

Embodiment 10

A method for producing a curable composition, wherein the method comprises:

mixing a composition comprising compound (a) having an isocyanate group and a composition comprising a compound having active hydrogen; and reacting compound (a) with the compound having active hydrogen to form a reaction composition comprising a compound having a perfluoropolyether group and a curable site, wherein the composition comprising compound (a) comprises an isocyanurate-type polyisocyanate and the content of a triisocyanate obtained by trimerizing a diisocyanate is 60% by mass or more based on the total mass of the composition comprising compound (a).

Embodiment 11

The method for producing a curable composition according to Embodiment 10, further comprising:

mixing the reaction composition and a solvent to form a precipitate; and separating the formed precipitate.

Embodiment 12

An article having a base material and a surface-treating layer which is formed on a surface of the base material from the curable composition according to Embodiment 6 or 7.

The invention claimed is:

1. A composition comprising at least one compound having a perfluoropolyether group and a curable site, wherein in a molecular weight distribution curve of the composition in gel permeation chromatography measurement, the following formula is satisfied:

$$M2/M1 \leq 3.0$$

wherein

M1 is a molecular weight at a main peak, and

M2 is a molecular weight at 25% intensity of an intensity of the main peak on a higher molecular weight side than M1.

2. The composition according to claim 1, wherein in a molecular weight distribution curve of the composition in gel permeation chromatography measurement, the following formula is further satisfied:

$$0.45 \leq M3/M1 < 1.0$$

wherein

M1 is a molecular weight at a main peak, and

M3 is a molecular weight at 25% intensity of an intensity of the main peak on a lower molecular weight side than M1.

3. The composition according to claim 1, wherein the compound having a perfluoropolyether group and a curable site comprises three isocyanate groups.

4. The composition according to claim 1, wherein the compound having a perfluoropolyether group and a curable site comprises an isocyanurate ring.

5. The composition according to claim 1, wherein the perfluoropolyether group represents:

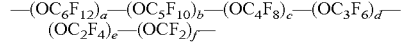

wherein a, b, c, d, e, and f are each independently an integer of 0 or more and 200 or less, a sum of a, b, c, d, e, and f is at least 1, and the occurrence order of respective repeating unit in parentheses with a, b, c, d, e, or f is not limited in the formula.

6. A curable composition comprising the composition according to claim 1.

7. The curable composition according to claim 6, further comprising at least one selected from the group consisting of a catalyst, a fluorine-containing oil, a curable resin, a curable monomer, an organic solvent, an active energy ray curing initiator, a photo-acid-generating agent, a surfactant, a polymerization inhibitor, and a sensitizer.

8. A method for producing the curable composition according to claim 1, wherein the method comprises:

mixing a composition comprising a compound (a) having an isocyanate group and a composition comprising a compound having active hydrogen;

reacting compound (a) with the compound having active hydrogen to form a compound having a perfluoropolyether group and a curable site;

mixing a reaction composition comprising the compound having a perfluoropolyether group and a curable site with solvents to form a precipitate comprising the compound having a perfluoropolyether group and a curable site; and separating the formed precipitate, wherein the solvents comprise a solvent in which the compound having the perfluoropolyether group and the curable site is substantially insoluble and a polar solvent.

9. The method for producing a curable composition according to claim 8, wherein the compound (a) comprises an isocyanurate ring and the content of a triisocyanate obtained by trimerizing a diisocyanate is 40% by mass or more based on the total mass of the composition comprising compound (a).

10. An article having a base material and a surface-treating layer which is formed on a surface of the base material from the curable composition according to claim 6.

* * * * *